(12) United States Patent
Corral

(10) Patent No.: US 8,422,517 B2
(45) Date of Patent: Apr. 16, 2013

(54) BALANCED BIT LOADING FOR COMMUNICATION NETWORKS SUBJECT TO BURST INTERFERENCE

(75) Inventor: Celestino A. Corral, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 12/849,159

(22) Filed: Aug. 3, 2010

(65) Prior Publication Data

US 2012/0033682 A1    Feb. 9, 2012

(51) Int. Cl.
*H04J 3/00* (2006.01)
(52) U.S. Cl.
USPC .......................................................... 370/476
(58) Field of Classification Search .................. 370/476, 370/468, 464, 477, 485, 329, 491, 500, 515, 370/334, 506, 389, 335, 320, 203; 375/260, 375/219, 222, 227; 455/450, 69
See application file for complete search history.

(56) References Cited

U.S. PATENT DOCUMENTS

| | | | |
|---|---|---|---|
| 5,619,505 A * | 4/1997 | Grube et al. .................. | 370/476 |
| 7,107,013 B2 | 9/2006 | Qiu | |
| 7,328,024 B2 | 2/2008 | Moon et al. | |
| 7,421,030 B2 | 9/2008 | Bolinth et al. | |
| 7,593,426 B1 * | 9/2009 | Lee et al. ..................... | 370/468 |
| 7,653,139 B2 * | 1/2010 | Li ................................ | 375/260 |
| 2002/0168013 A1 | 11/2002 | Attallah et al. | |
| 2003/0097623 A1 | 5/2003 | Razavilar et al. | |
| 2005/0013303 A1 | 1/2005 | Gopalakrishnan et al. | |
| 2005/0122912 A1 | 6/2005 | Jeon et al. | |
| 2005/0152465 A1 | 7/2005 | Maltsev et al. | |
| 2006/0153309 A1 | 7/2006 | Tang et al. | |
| 2007/0110176 A1 | 5/2007 | Wu et al. | |
| 2008/0253401 A1 | 10/2008 | Thyagarajan et al. | |
| 2009/0116554 A1 | 5/2009 | Ma et al. | |
| 2012/0033619 A1 | 2/2012 | Corral | |

FOREIGN PATENT DOCUMENTS

| | | |
|---|---|---|
| WO | WO2002100025 | 12/2002 |
| WO | WO2012018798 | 2/2012 |

OTHER PUBLICATIONS

International Search Report and Written Opinion—PCT/US2011/046245—ISA/EPO—Dec. 12, 2011.
International Search Report and Written Opinion—PCT/US2011/046291—ISA/EPO—Dec. 7, 2011.
Jung, B.C. et al., "Determining the optimum threshold values for retransmission packets in HARQ schemes", VTC 2003, vol. 3 Apr. 2003 , pp. 1935-1939.
Zhou, L. et al., "Reduced-rate retransmissions for spread-spectrum packet radio multimedia networks", IEEE Trans. Wireless Commun., vol. 5 Apr. 2006 , pp. 779-788.

* cited by examiner

*Primary Examiner* — Chi Pham
*Assistant Examiner* — Alexander O Boakye
(74) *Attorney, Agent, or Firm* — DeLizio Gilliam, PLLC

(57) ABSTRACT

Wired and wireless communication networks can be subject to burst interference resulting in loss of throughput and data corruption. In a communication system comprising a transmitting network device and a receiving network device, the transmitting network device can be configured to implement balanced bit loading for retransmitting packets of a failed packet transmission. On receiving a request for retransmission from the receiving network device, the transmitting network device can identify and eliminate sub-carriers that are associated with a bit load that is less than a predefined bit load threshold. The transmitting network device can attempt to reallocate bit loads of the eliminated sub-carriers to remaining sub-carriers across two or more constituent symbols per original symbol.

30 Claims, 14 Drawing Sheets

BALANCED BIT LOADING FOR COMMUNICATION NETWORKS SUBJECT TO BURST INTERFERENCE

BACKGROUND

Embodiments of the inventive subject matter generally relate to the field of communication networks and, more particularly, to balanced bit loading for communication networks subject to burst interference.

Various types of electronic devices can use wired or wireless communication networks for data communication. In one example, electric power lines typically used for distributing electric power to buildings and other structures can also be used to implement broadband over powerline communication (in a wired powerline communication network) within the buildings and other structures. Powerline communication provides a means for networking electronic devices (e.g., consumer electronics, smart appliances, etc.) together and also connecting the electronic devices to the Internet. For example, HomePlug® devices can be used for wired broadband networking using IEEE P1901 standards for broadband over powerline communication. In another example, wireless local area networks (WLANs) can enable electronic devices to wirelessly exchange data and connect to the Internet. However, both wired and wireless communication networks can be subject to burst interference, which can corrupt data packet exchanged via the communication networks.

SUMMARY

Various embodiments for balanced bit loading for communication networks subject to burst interference are disclosed. In one embodiment, it is determined at a first network device of a communication network that a transmission of an original packet to a second network device of the communication network failed. The original packet comprises one or more original symbols. For each original symbol of the original packet, a subset of a plurality of sub-carriers of the original symbol that are associated with a bit load that is less than a predefined bit load threshold are identified at the first network device. For each original symbol of the original packet, the subset of the plurality of sub-carriers that are associated with the bit load that is less than the predefined bit load threshold are eliminated at the first network device. For each original symbol of the original packet, a bit load of each of a remainder of the plurality of sub-carriers of the original symbol is allocated, at the first network device, across two or more constituent symbols associated with the original symbol. It is determined, at the first network device, for each original symbol of the original packet, how to allocate at least a portion of the bit loads associated with the subset of the plurality of sub-carriers of the original symbol that were eliminated across the two or more constituent symbols associated with the original symbol. At least the portion of the bit loads associated with the subset of the plurality of sub-carriers of the original symbol that were eliminated is allocated to the two or more constituent symbols associated with the original symbol.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
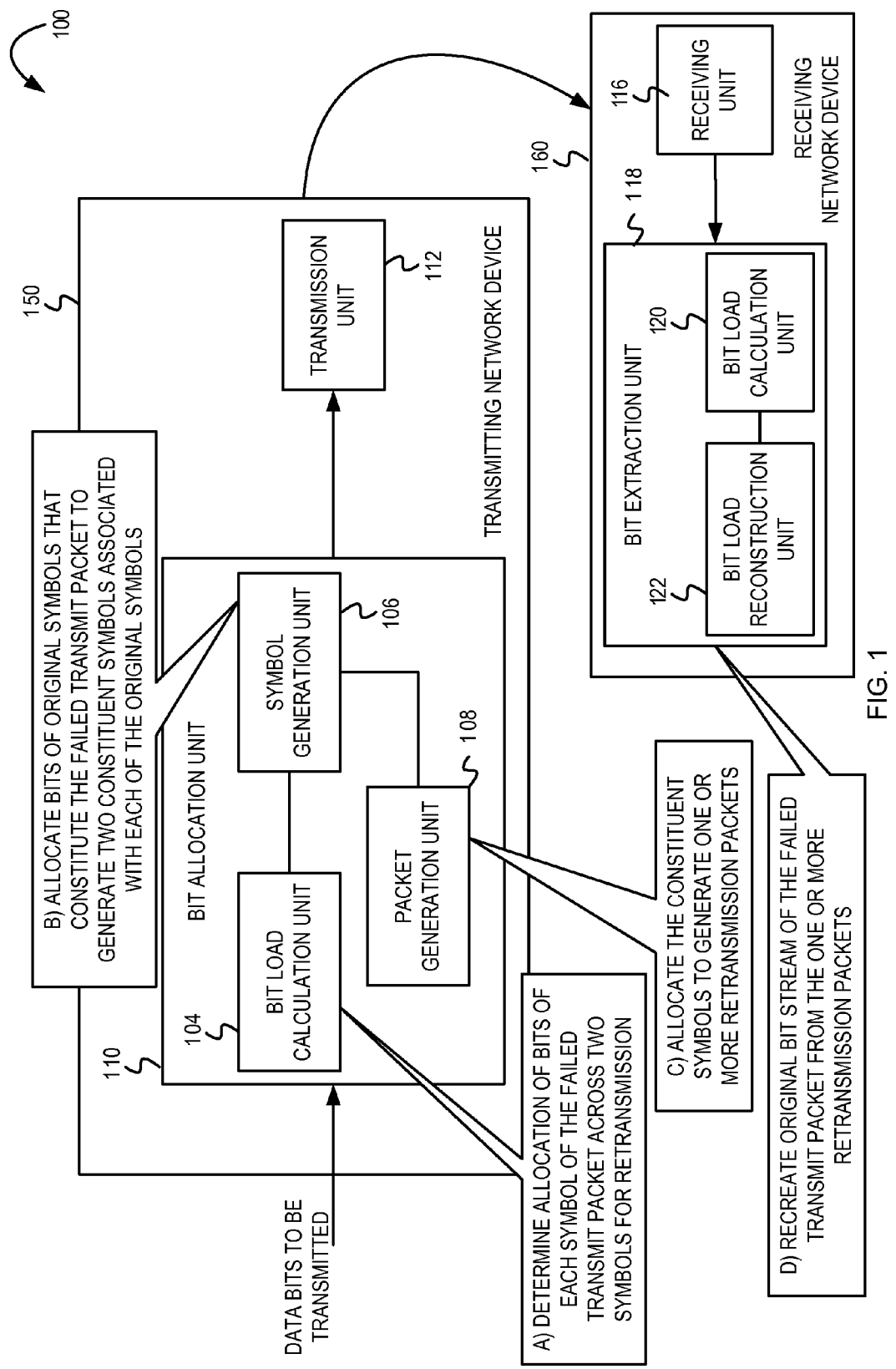
FIG. 1 is an example block diagram illustrating a communication network comprising network devices configured for dynamic bit allocation.

The description that follows includes exemplary systems, methods, techniques, instruction sequences, and computer program products that embody techniques of the present inventive subject matter. However, it is understood that the described embodiments may be practiced without these specific details. For instance, although examples refer to a dynamic bit allocation technique for orthogonal frequency division multiplexing (OFDM) modulation systems, embodiments are not so limited. The dynamic bit allocation technique as described herein can also be extended to single carrier modulation schemes. Furthermore, although examples refer to implementing the dynamic bit allocation technique in a powerline communication network, in other embodiments, the dynamic bit allocation technique can be implemented in other communication systems, such as wireless local area networks (WLANs). In other instances, well-known instruction instances, protocols, structures, and techniques have not been shown in detail in order not to obfuscate the description.

Broadband over powerline communication focuses on enabling broadband communication via existing powerline networks (e.g., power lines in homes and buildings). However, powerline networks, being originally designed for power transfer, are subject to time varying and frequency varying noise sources. For example, energy saving devices, lighting devices, etc. can result in noise on the powerline network and can corrupt data packets transmitted for broadband over powerline communication. Powerline networks also do not have controlled impedances. In other words, the impedance as seen by communicating network devices is determined by a number and type of powerline devices (e.g., switches, mobile phone chargers, energy saving devices, lighting devices, etc.) connected to the powerline network. Some powerline devices may also modulate the impedance of the powerline network, causing the impedance to vary from one outlet to another and compromising communication performance of the powerline network. Moreover, a multi-dwelling unit (MDU) environment (e.g., a building with multiple apartment units), can comprise multiple independent neighboring powerline networks (e.g., one for each apartment unit) supported by a common powerline communication medium. This can result in random or burst interference between the powerline networks and can reduce the throughput of each of the powerline networks. As additional powerline networks are deployed within the powerline communication medium, the probability of collisions between the powerline networks of the MDU can increase, further impacting network performance. Coordinating communications between the powerline networks of the MDU can be a very inefficient process and can result in a drop in throughput and loss of data bandwidth.

Network devices in wired or wireless communication networks that are subject to burst interference can be configured to implement a dynamic bit allocation technique. For example, network devices communicating via powerline networks can be configured to implement the dynamic bit allocation technique to efficiently use the powerline communication medium under time-varying and frequency-varying channel and noise events. If a transmitting network device does not receive an acknowledgement to a transmitted packet or receives an indication of an excessive error rate, the transmitting network device can dynamically allocate bits of the original symbols subject to interference among multiple constituent symbols (e.g., two constituent symbols per original symbol) in accordance with the dynamic bit allocation technique (see FIGS. 1-5). The modulation and coding of the constituent symbols is modified such that the signal-to-interference ratio (SIR) on each sub-carrier used to modulate the constituent symbols is improved, thus improving network performance. In accordance with the dynamic bit allocation technique, the transmitting network device can vary transmit parameters (e.g., bit load of carriers, transmit power, forward error correction rate, etc.) to generate robust retransmission packets comprising the constituent symbols. The constituent symbols can also be spread in time to exploit time diversity in the retransmission packets (see FIGS. 6-8). Furthermore, in some embodiments, the transmitting device can implement a balanced bit loading technique in conjunction with the dynamic bit allocation technique (see FIGS. 10-11 and 13). The transmitting network device can balance bit loads associated with each sub-carrier of each constituent symbol to enforce a minimum signal-to-noise ratio for each sub-carrier, and to enable transmission of at least a minimum number of bits per sub-carrier. In other words, sub-carriers that do not meet the minimum signal to noise ratio (or that are allocated a bit load that is less than a threshold bit load) can be eliminated and the bit load allocated to the eliminated sub-carrier can be re-allocated to other sub-carriers to increase the probability of successful transmission of the retransmission packets. Such a technique for dynamically adjusting the bit load of transmissions subject to burst interference, and retransmitting the bit load at a lower modulation level can increase the signal to noise ratio (SNR) margin while simultaneously exploiting time diversity. This can also result in greater signal to interference margins, improve the SNR margin per sub-carrier, can improve the robustness of the packet retransmission, increase the probability of a successful transmission, and reduce performance degradation.

FIG. 1 is an example block diagram illustrating a communication network 100 comprising network devices configured for dynamic bit allocation. The communication network 100 comprises a transmitting network device 150 and a receiving network device 160. The transmitting network device 150 comprises a bit allocation unit 110 and a transmission unit 112. The bit allocation unit 110 comprises a bit load calculation unit 104, a symbol generation unit 106, and a packet generation unit 108. The symbol generation unit 106 is coupled to the bit load calculation unit 104 and to the packet generation unit 108. The receiving network device 160 comprises a receiving unit 116 and a bit extraction unit 118. The bit extraction unit 118 comprises a bit load calculation unit 120 coupled to a bit load reconstruction unit 122. It is noted that although not depicted in FIG. 1, the transmitting network device 150 can also comprise the receiving unit 116 and the bit extraction unit 118 to receive and to process packets received from other network devices. Likewise, the receiving network device 160 can also comprise the bit allocation unit 110 and the transmission unit 112 to generate and transmit packets to other network devices.

The transmitting network device 150 can comprise a bit processing unit (e.g., bit processing unit 201 shown in FIG. 2) that pre-processes data bits to be transmitted prior to the dynamic bit allocation. The bit processing unit can select a forward error correction (FEC) rate and can communicate an initial known bit stream (e.g., training symbols) to the receiving network device 160 to perform channel estimation. In one implementation, the transmitting network device 150 and the receiving network device 160 can consider the communication channel to be quasi-time-invariant and can accordingly perform channel estimation to determine an optimal bit load for each sub-carrier of the communication channel for a pre-defined bit error rate (BER). The optimal bit load for a sub-carrier indicates a maximum number of bits that can be mapped to the sub-carrier without exceeding the requisite BER. In one implementation, the data bits to be transmitted may be modulated onto a plurality of sub-carriers to generate one or more original OFDM symbols. The transmitting network device 150 transmits an original packet comprising the one or more original OFDM symbols to the receiving network device 160. If burst interference on the communication channel is strong enough to disrupt communication between the transmitting network device 150 and the receiving network device 160, the receiving network device 160 notifies the transmitting network device 150 by either not acknowledging the original packet or by reporting excessive BER. Accordingly, the bit allocation unit 110 of the transmitting network device 150 can dynamically allocate bits of the original symbol across two constituent symbols, as will be described below in stages A-D, and in more detail in FIGS. 3-13.

At stage A, the bit load calculation unit 104 determines allocation of bits of each original symbol of a failed transmit packet across two symbols for retransmission. After transmission of the original packet fails, the bit load calculation unit 104 can perform operations (that will be described in further detail with reference to FIG. 4) to determine how to split an original bit load of each sub-carrier of each original symbol into two constituent bit loads associated with each of the sub-carriers, in order for the bit allocation unit 110 to dynamically allocate the bits of each original symbol across two constituent symbols for retransmission. For each sub-carrier of the original symbol, the bit load calculation unit 104 determines a first constituent bit load of the sub-carrier that represents a subset of bits (of the original bit load) that can be modulated on the sub-carrier as part of a first constituent symbol. For each sub-carrier of the original symbol, the bit load calculation unit 104 determines a second constituent bit load of the sub-carrier that represents the remaining bits (of the original bit load) that can be modulated on the sub-carrier as part of a second constituent symbol. For each sub-carrier, the original bit load represents the total number of bits modulated on the sub-carrier in the original symbol. For example, if 10 bits are modulated on a first sub-carrier as part of the original symbol of the failed transmit packet, the original bit load of the first sub-carrier is 10 bits. The bit load calculation unit 104 can determine that the original bit load (i.e., 10 bits) can be split into a first constituent bit load of 6 bits and a second constituent bit load of 4 bits. Accordingly, the bit allocation unit 110 can generate a first constituent symbol comprising 6 bits modulated on the first sub-carrier and a second constituent symbol comprising 4 bits modulated on the first sub-carrier, as will be described in stage B. Additionally, the bit load calculation unit 104 can take other transmit parameters into consideration when determining the constituent bit loads of each of the sub-carriers. For example, as will be described with reference to FIG. 12, the transmit power and FEC rate of an OFDM waveform that comprises the constituent symbols can be decreased depending on an average SNR margin associated with the constituent symbols. As another example, as will be described with reference to FIGS. 10-11, some of the sub-carriers can be dropped based on the original bit load of each of the sub-carriers of the original symbol.

At stage B, the symbol generation unit 106 allocates bits of the original symbols that constitute the failed transmit packet to generate two constituent symbols associated with each of the original symbols. Allocating bits that constitute one original symbol across two constituent symbols enables time diversity. The symbol generation unit 106 divides the bits per sub-carrier of the original symbol to the corresponding sub-carrier of the first and the second constituent symbols, as will be described in FIGS. 4-5. With reference to the example of stage A, the symbol generation unit 106 can determine, based on an indication from the bit load calculation unit 104, that the first and the second constituent bit loads associated with the sub-carrier are 6 bits and 4 bits, respectively. Accordingly, the symbol generation unit 106 can allocate six bits (of the ten bits previously modulated on the sub-carrier of the original symbol) to the sub-carrier of the first constituent symbol and can allocate the remaining four bits to the sub-carrier of the second constituent symbol.

At stage C, the packet generation unit 108 allocates the constituent symbols (generated at stage B) to generate one or more retransmission packets. As will be described with reference to FIGS. 6-8, the packet generation unit 108 can allocate the constituent symbols associated with all the original symbols of the failed transmit packet across one or more retransmission packets to achieve time diversity. For example, the packet generation unit 108 can allocate constituent symbols associated with an original symbol successively to achieve time diversity across one symbol. As another example, the packet generation unit 108 can allocate constituent symbols associated with N original symbols to achieve time diversity across N symbols. As another example, the packet generation unit 108 can allocate one constituent symbol associated with an original symbol to one retransmission packet and can allocate another constituent symbol associated with the original symbol to another retransmission packet to achieve time diversity across one packet.

Figure 2:
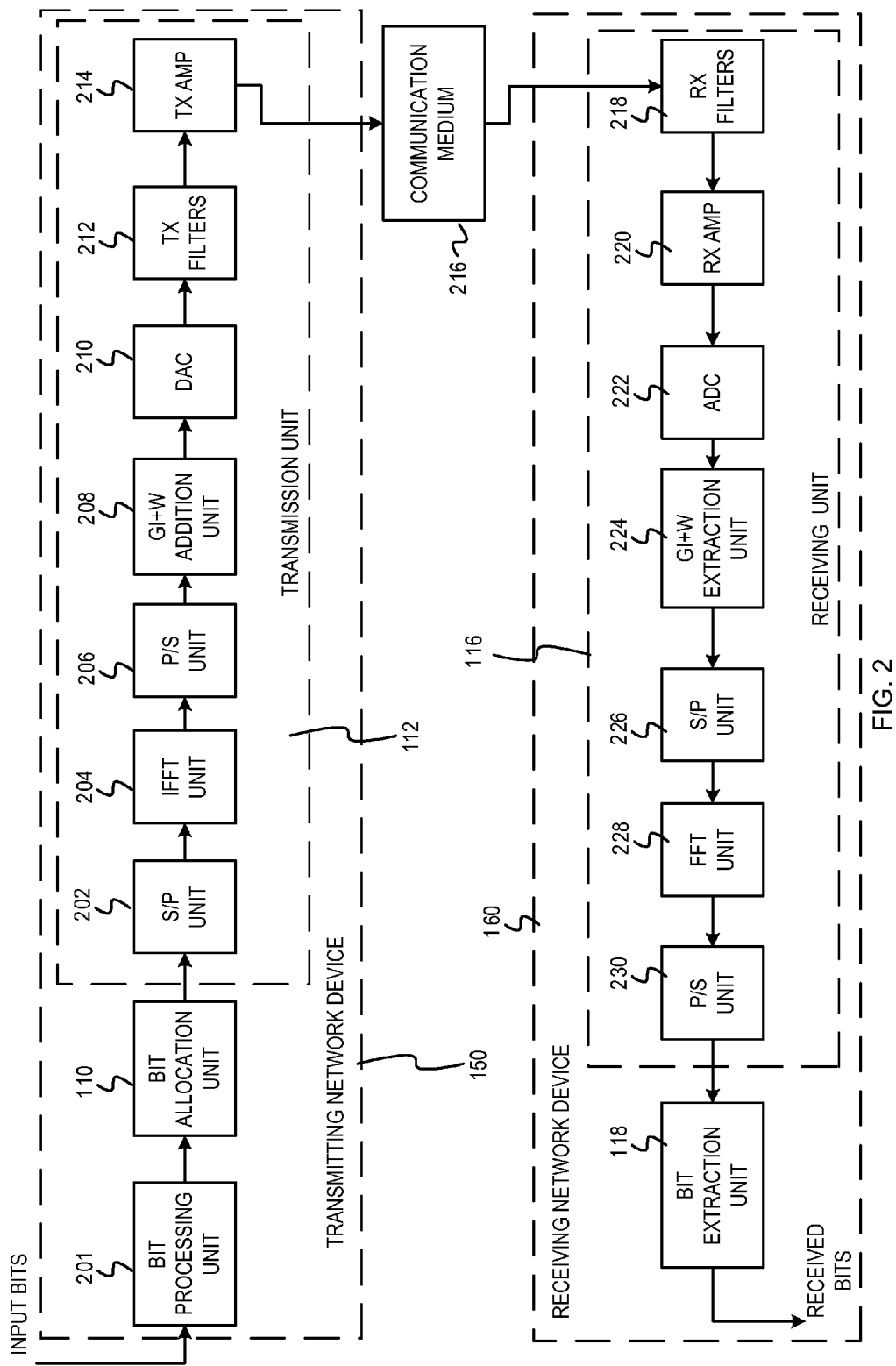
FIG. 2 is a block diagram illustrating an example OFDM transmitter and receiver for implementing the dynamic bit allocation technique.

The packet generation unit 108 then provides the one or more retransmission packets to the transmission unit 112. FIG. 2 is a block diagram illustrating an example OFDM transmitter and receiver for implementing the dynamic bit allocation technique. As depicted in FIG. 2, the transmitter network device 150 comprises a bit processing unit 201, the bit allocation unit 110, and the transmission unit 112. In one embodiment, the transmission unit 112 comprises a serial-to-parallel conversion unit (S/P) 202, an inverse fast Fourier transform (IFFT) unit 204, a parallel-to-serial conversion (P/S) unit 206, a guard interval (GI) and windowing unit (W) addition unit 208, a digital-to-analog converter (DAC) 210, one or more transmit filters 212, an a transmit amplifier 214.

The transmitting network device 150 communicates with the receiving network device 160 via a communication medium 216 (e.g., a powerline network, a WLAN, etc.). The receiving network device 160 comprises the receiving unit 116 and the bit extraction unit 118. In one embodiment, the receiving unit 116, as depicted in FIG. 2, comprises one or more receive filters 218, a receive amplifier 220, an analog-to-digital converter (ADC) 222, a GI+W extraction unit 224, a S/P conversion unit 226, an FFT unit 228, and a P/S conversion unit 230. The output of the P/S conversion unit 230 is provided to the bit extraction unit 118. It is noted that although not depicted in FIG. 2, the transmitting network device 150 can also comprise components of the receiving network device 160 to receive and to process packets received from other network devices. Likewise, the receiving network device 160 can also comprise components of the transmitting network device 150 to generate and transmit packets to other network devices.

The bit processing unit 201 receives the data bits to be transmitted to the receiving network device 160. The bit processing unit 201 can scramble the data bits, FEC encode the data bits, and interleave the data bits. As described with reference to FIG. 1, the bit allocation unit 110 can map the bits of each of the original symbols that constitute an original packet into two constituent symbols per original symbol, in response to determining that the original packet should be retransmitted to the receiving network device 160. In some implementations, the bit allocation unit 110 may be disabled when the original packet is transmitted. The bit allocation unit 110 may be enabled only when it is determined that one or more retransmission packets should be generated and transmitted. The serial symbol stream at the output of the bit allocation unit 110 is converted into a parallel format by the S/P conversion unit 202 and is further processed by the IFFT unit 204. The IFFT unit 204 converts a frequency domain signal into a time domain signal. The P/S conversion unit 206 converts the IFFT parallel complex output into a serial format to generate digital samples of an OFDM waveform. The GI+W addition unit 208 appends a guard interval to the digital samples of the OFDM waveform and performs windowing on the OFDM waveform to reduce out-of-band spectral energy. The DAC 210 converts the digital samples to analog samples and the transmit filters 212 filter the analog samples to smooth the output OFDM waveform and to remove any images at the transmitting network device 150. The transmit amplifier 214 provides signal gain and proper coupling impedance to the communication medium 216 for maximum signal power transfer.

The receiving unit 116 receives the OFDM waveform transmitted by the transmitting network device 150. The receive filter 218 (e.g., a band pass filter) filters the OFDM waveform and the receive amplifier 220 adjusts the gain to set the signal level of the received OFDM waveform within a requisite amplitude range of the ADC 222. The ADC 222 converts the received analog signal to digital data samples. The GI+W extraction unit 224 performs windowing on the digital data samples, extracts a window (e.g., a band of frequencies) that comprises the data symbols and removes the guard interval. The S/P conversion unit 226 converts serial digital data samples into a parallel format. The output of the S/P conversion unit 226 is provided to the FFT unit 228. The FFT unit 228 converts a time domain digital received signal into a frequency domain signal. The parallel output of the FFT unit 228 is provided to the P/S conversion unit 230, and the P/S conversion unit 230 converts the parallel complex symbol output of the FFT unit 228 to a serial symbol stream. The output of the P/S conversion unit 230 is provided to the bit extraction unit 118. As will be described with reference to stage D in FIG. 1, the bit extraction unit 118 executes operations for bit de-allocation and reconstruction to recover an original bit stream from the constituent symbols in the retransmission packets. Additionally, the bit extraction unit 118 can also perform symbol-to-bit mapping, de-interleaving, decoding, and de-scrambling to recover the original bit stream. It is noted that one or more components of the bit extraction unit 118 (e.g., the bit re-ordering unit 122 and the bit load calculation unit 120) may be enabled only if dynamic bit allocation was implemented at the transmitting network device 150, in order to recover the original bit stream.

Referring back to FIG. 1, at stage D, the bit load reconstruction unit 122 of the receiving network device 160 recreates the original bit stream of the failed transmit packet from the one or more retransmission packets. In one implementation, the bit extraction unit 118 can communicate retransmission parameters to the bit allocation unit 110. The retransmission parameters can indicate how the bits of the original packet are to be allocated across two constituent symbols per original symbol, how the constituent symbols are to be allocated to one or more retransmission packets for time diversity, etc. The bit allocation unit 110 can generate the constituent symbols and the retransmission packets based, at least in part, on the retransmission parameters. The bit load calculation unit 120 can determine how the original bit stream will be allocated to form the constituent symbols at the transmitting network device 150 (as will be described in FIG. 4). Also, the bit extraction unit 118 can keep track of the retransmission parameters communicated to the bit allocation unit 110. For example, on receiving the constituent symbols in the retransmission packets, the bit extraction unit 118 can determine that the constituent symbols were sequentially allocated to the retransmission packets in accordance with the retransmission parameters. Accordingly, the bit load reconstruction unit 122 can identify constituent symbols that comprise bits of the original symbol. Next, for each sub-carrier, based on the output of the bit load calculation unit 120, the bit load reconstruction unit 122 may determine that an original sub-carrier bit load of K bits was divided into constituent sub-carrier bit loads B and P (i.e., K=B+P). Accordingly, for each sub-carrier, the bit load reconstruction unit 122 can extract B bits of the sub-carrier from the first constituent symbol and extract P bits of the sub-carrier from the second original symbol to generate the original bit stream. This will further be described with reference to FIG. 9.

It is noted that in some implementations, one or more components of the bit allocation unit 110 may be implemented as part of the transmission unit 112. For example, the symbol generation unit 106 may allocate bits of original symbols to form two constituent symbols per original symbol. The bit stream comprising the constituent symbols may be provided to the transmission unit 112 for mapping to appropriate sub-carriers and for further processing to generate the retransmission packets as described with reference to FIG. 2. Furthermore, it is noted that although FIG. 1 describes operations for allocating the bits of each original symbol across two constituent symbols, in other embodiments, the bits of each original symbol can be allocated across any suitable number of constituent symbols.

Figure 3:
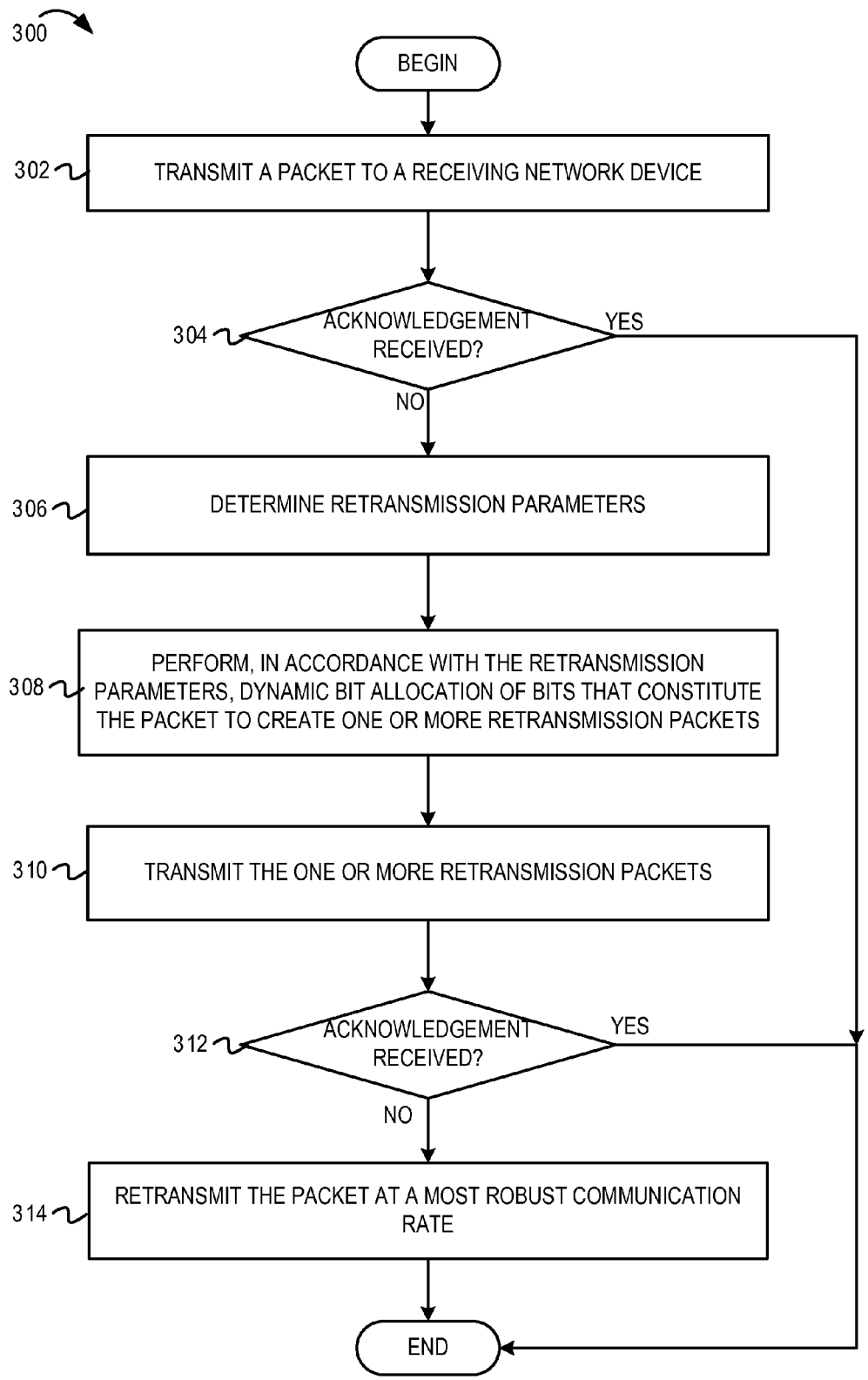
FIG. 3 is a flow diagram illustrating example operations for dynamic bit allocation in a retransmission packet.

FIG. 3 is a flow diagram ("flow") 300 illustrating example operations for dynamic bit allocation in a retransmission packet. Flow 300 begins at block 302.

At block 302, an original packet is transmitted to a receiving network device. For example, with reference to FIG. 1, the transmitting network device 150 transmits the original packet to the receiving network device 160. The original packet may be a packet comprising a plurality of original symbols that are transmitted by the transmitting network device 150 to the receiving network device 160. In one implementation, the original symbols may be OFDM symbols where a predetermined number of bits are modulated on each of a predetermined number of sub-carriers. In another implementation, the original symbols may be generated by mapping bits on a single carrier using a suitable single-carrier modulation technique. Also, in some implementations, the transmitting network device 150 and the receiving network device 160 may be powerline communication devices and may communicate with each other via a powerline network. In other implementations, the transmitting network device 150 and the receiving network device 160 may communicate via other wired (e.g., Ethernet) or wireless (e.g., wireless local area network (WLAN)) communication networks. The flow continues at block 304.

At block 304, it is determined whether an acknowledgement for the transmitted original packet is received. For example, the transmitting network device 150 determines whether an acknowledgement (ACK) packet was received from the receiving network device 160 in response to the original packet transmitted at block 302. The transmitting network device 150 may wait for a predetermined interval of time (e.g., an ACK window) to receive the ACK packet. If the transmitting network device 150 does not receive the ACK packet within the ACK window, the transmitting network device 150 can assume that packet transmission failed and can perform operations described herein to retransmit the original packet. In some implementations, the transmitting network device 150 may receive a negative acknowledgement (NACK) packet from the receiving network device 160. The NACK packet can serve to request retransmission of the original packet. In some implementations, the transmitting network device 150 may also receive an indication that a bit error rate (BER) of a communication link between the transmitting network device 150 and the receiving network device 160 is greater than a threshold BER. In some implementations, the receiving network device 160 can use cumulative or selective acknowledgment (SACK) packets to inform the transmitting network device 150 of the state of the last received packet. If it is determined that the acknowledgement was not received, the flow continues at block 306. Otherwise, the flow ends.

At block 306, retransmission parameters are determined. For example, the bit allocation unit 110 of the transmitting network device 150 determines the retransmission parameters. In some implementations, the bit allocation unit 110 can receive an indication of the retransmission parameters from the receiving network device 160 (e.g., the bit extraction unit 118 of the receiving network device 160). For example, the bit extraction unit 118 can indicate, to the bit allocation unit 110, that constituent symbols associated with N original symbols should be interlaced (for time diversity) to form one or more retransmission packets. In other implementations, the bit allocation unit 110 may not receive the indication of the retransmission parameters from the bit extraction unit 118. Instead, the bit allocation unit 110 can determine a set of default retransmission parameters previously agreed upon by the transmitting network device 150 and the receiving network device 160. The retransmission parameters can indicate a bit load per sub-carrier of the constituent symbols and can indicate how the constituent symbols are to be allocated to generate one or more retransmission packets. The bit load calculation unit 104 of the bit allocation unit 110 can determine how the original bit load of each sub-carrier is to be divided across two constituent symbols, as will be described with reference to FIGS. 4-5. In some implementations, the retransmission parameters can also indicate a threshold SNR margin, a threshold bit load per sub-carrier, thresholds for transmit power adjustment and FEC adjustment, how to reallocate bits if a sub-carrier is dropped, as will be described with reference to FIGS. 10-13. The flow continues at block 308.

At block 308, dynamic allocation of bits that constitute the failed transmit packet is performed in accordance with the retransmission parameters to create one or more retransmission packets. For example, the symbol generation unit 106 dynamically allocates the bits of the original symbols to create two constituent symbols per original symbol as will be described in FIGS. 4-5. As will be described in FIGS. 10-13, the symbol generation unit 106 can also take into account retransmission parameters, such as threshold SNR margin, threshold bit load per sub-carrier, etc., to dynamically reallocate the bits that constitute the failed transmit packet to create the constituent symbols. The packet generation unit 108 can allocate the constituent symbols, in accordance with the retransmission parameters, to generate the one or more retransmission packets. The flow continues at block 310.

At block 310, the one or more retransmission packets are transmitted. For example, the transmission unit 112 further processes (e.g., as shown in the OFDM system of FIG. 2) and then transmits the one or more retransmission packets to the receiving network device 160. The flow continues at block 312.

At block 312, it is determined whether an acknowledgement for the one or more retransmission packets was received. For example, as described above with reference to block 304, the transmitting network device 150 determines whether the acknowledgement was received in response to the one or more retransmission packets transmitted at block 310. If it is determined that the acknowledgement was not received, the flow continues at block 314. Otherwise, the flow ends.

At block 314, the packet is retransmitted at a most robust communication rate. In one implementation, in response to determining that an acknowledgement for the retransmission packets was not received, the bit allocation unit 110 can cause the original packet (previously transmitted at block 302) to be retransmitted at the most robust communication rate. In another implementation, the one or more retransmission packets (previously transmitted at block 310) may be retransmitted at the most robust communication rate. The retransmission parameters (e.g., received from the receiving network device 160 or the default retransmission parameters) can indicate whether the original packet or the one or more retransmission packets are to be retransmitted at the robust communication rate. The robust communication rate can be a predefined modulation rate and may be a lowest modulation rate (e.g., a low data transmit rate, a high FEC rate, a high transmit power, etc.) supported by the transmitting network device 150 and the receiving network device 160. For example, the predefined modulation rate selected as the robust communication rate may use copies of data to be transmitted across the communication channel in addition to using the lowest modulation rate. From block 314, the flow ends.

Figure 4:
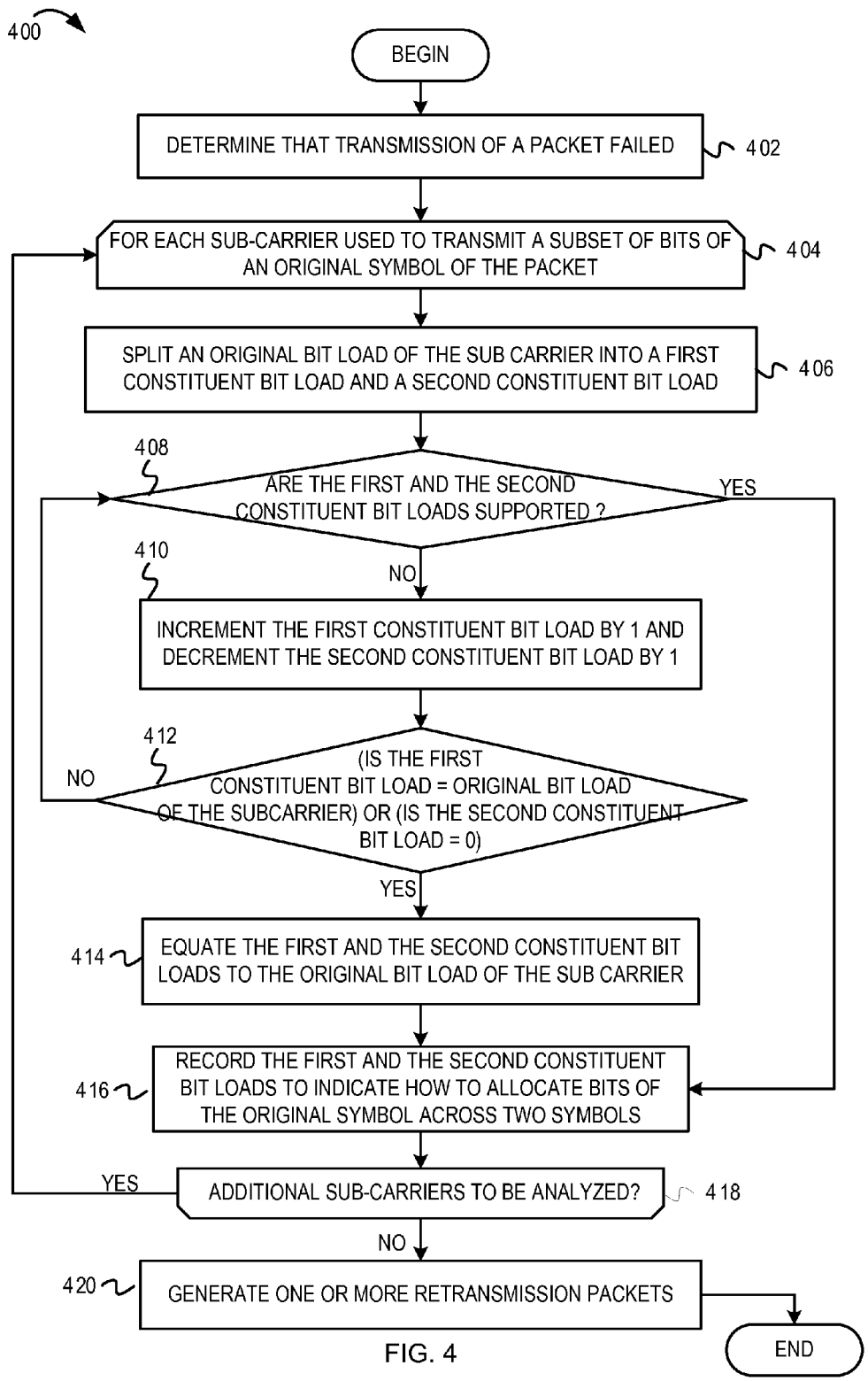
FIG. 4 is a flow diagram illustrating example operations for dynamic bit load allocation on a per sub-carrier basis.

FIG. 4 is a flow diagram 400 illustrating example operations for dynamic bit load allocation on a per sub-carrier basis. Flow 400 begins at block 402.

At block 402, it is determined that transmission of a packet failed. For example, the transmitting network device 150 of FIG. 1 determines that transmission of the packet failed. The transmitting network device 150 can determine that transmission of the packet failed in response to receiving a NACK packet or a SACK packet from the receiving network device 160, in response to receiving an indication that a BER exceeds a predetermined BER threshold, in response to not receiving an ACK packet within a predetermined time interval, etc. The flow continues at block 404.

At block 404, a loop begins for each sub-carrier used to transmit a subset of bits of an original symbol of the packet. For example, the bit load calculation unit 104 of FIG. 1 performs operations described with reference to blocks 406-416 for each sub-carrier used to transmit a subset of bits of the original symbol that constitutes the failed transmit packet. It is noted that the operations described with reference to blocks 406-416 can be repeated for each symbol when the failed transmit packet comprises more than one symbol. Because each sub-carrier of an OFDM symbol is associated with a different bit load (e.g., determined during channel estimation), the operations described with reference to blocks 406-416 are performed for each sub-carrier of the original symbol. During the channel estimation process, the transmitting network device 150 and the receiving network device 160 negotiate and determine a bit load per sub-carrier of the OFDM waveform based on interference and noise on the sub-carrier, dynamics of transmitter and receiver components (e.g., a power amplifier), and/or other network specific considerations (e.g., impact of powerline devices connected to the powerline network). In some implementations, the transmitting network device 150 and the receiving network device 160 may perform channel estimation and determine the bit load per sub-carrier before exchanging data. In another implementation, the transmitting network device 150 and the receiving network device 160 may periodically sense the communication channel and may perform channel estimation and determine the bit load per sub-carrier every pre-defined interval of time (or on detecting a change in the communication channel). The flow continues at block 406.

At block 406, for each sub-carrier of the original symbol, the original bit load of the sub-carrier is split into a first constituent bit load and a second constituent bit load associated with the sub-carrier. For example, the bit load calculation unit 104 of the transmitting network device 150 splits the original bit load (K) of the sub-carrier into the first constituent bit load (B) and the second constituent bit load (P). The original bit load of the sub-carrier is allocated equally between the first and the second constituent bit loads. For example, if the nth sub-carrier of the original symbol supported K bits, the nth sub-carrier of the first constituent symbol for the subsequent retransmission will comprise the first K/2 bits, while the nth sub-carrier of the second constituent symbol will comprise the remaining K/2 bits. If the original bit load cannot be equally divided between the first and the second constituent bit loads, the second constituent bit load can be allocated a next closest integer that maps to K/2 (represented as floor(K/2)) bits and the first constituent bit load can be allocated the remainder of the original bit load, as illustrated by Eqs. 1. For example, if the nth sub-carrier of the original symbol supports 3 bits, the nth sub-carrier of the second constituent symbol (i.e., the second constituent bit load) for the subsequent retransmission will comprise 1 bit (e.g., floor(3/2)=1). The nth sub-carrier of the first constituent symbol (i.e., the first constituent bit load) will comprise the remaining 2 bits. The first and the second constituent bit loads can further be analyzed as will be described below. The flow continues at block 408.

$$K = B + P$$
$$P = \text{floor}\left(\frac{K}{2}\right); \text{ and}$$
$$B = K - P$$

Eqs. 1

At block 408, for each sub-carrier, it is determined whether both the first constituent bit load and the second constituent bit load are supported. For example, the bit load calculation unit 104 determines whether the first constituent bit load and the second constituent bit load calculated at block 406 are supported. The bit loads supported by the transmitting network device 150 and the receiving network device 160 for communication via the communication channel may be determined during a channel estimation process and may be agreed upon by the transmitting network device 150 and the receiving network device 160. For example, the transmitting network device 150 and the receiving network device 160 may determine that fractional bit loads (e.g., a bit load of ½ bit or lower) should not be supported. As another example, it may be determined that odd numbered bit loads (e.g., 5 bits) are not supported. The bit load calculation unit 104 can maintain a list of supported bit loads and can access the list of the supported bit loads to determine whether the first constituent bit load and the second constituent bit load are supported. For example, the original bit load may be 10 bits and the bit load calculation unit 104 may allocate 5 bits each to the first and the second constituent bit loads. The bit load calculation unit 104 may determine that the first and the second constituent bit loads (i.e., 5 bits) are not supported. As another example, the original bit load may be 12 bits and the bit load calculation unit 104 may allocate 6 bits each to the first and the second constituent bit loads. The bit load calculation unit 104 may determine that the first and the second bit loads (i.e., 6 bits) are supported. If the bit load calculation unit 104 determines that both the first constituent bit load and the second constituent bit load are supported, the flow continues at block 416. Otherwise, the flow continues at block 410.

At block 410, the first constituent bit load is incremented by 1 and the second constituent bit load is decremented by 1. For example, the bit load calculation unit 104 increments the first constituent bit load by one (i.e., B=B+1) and decrements the second constituent bit load by one (i.e., P=P−1) in an effort to identify constituent bit loads that are supported. For example, for an original bit load of 10 bits, allocating the bits equally across the first and the second constituent bit loads results in 5 bits being allocated to the first and the second constituent bit loads. The bit load calculation unit 104 may determine that odd bit loads (e.g., 5 bits) are not supported. Accordingly, the bit load allocation unit 104 may allocate 6 bits of the 10 bit original bit load to the first constituent bit load and the remaining 4 bits to the second constituent bit load. The flow continues at block 412.

At block 412, it is determined whether the first constituent bit load is equal the original bit load associated with the sub-carrier or whether the second constituent bit load equals zero. For example, the bit load calculation unit 104 determines whether the first constituent bit load is equal to the original bit load associated with the sub-carrier (i.e., B=K) or whether the second constituent bit load equals zero (i.e., P=0). The condition of block 412 being satisfied indicates that all the bits of the original symbol will be allocated to one constituent symbol and that no bits of original symbol will be allocated to the other constituent symbol. The condition of block 412 being satisfied also indicates that there are no bit loads (other than the original bit load) that are supported. If it is determined that first constituent bit load equals the original bit load associated with the sub-carrier or that the second constituent bit load equals zero, the flow continues at block 414. Otherwise, the flow loops back to block 408, where it is determined whether the first and the second constituent bit loads calculated in block 410 are supported.

At block 414, the first and the second constituent bit loads are equated to the original bit load associated with the sub-carrier. The flow 400 moves from block 412 to block 414 if is determined that either the first constituent bit load is equal the original bit load associated with the sub-carrier or that the second constituent bit load equals zero. For example, the bit load calculation unit 104 equates the first and the second constituent bit loads to the original bit load associated with the sub-carrier (i.e., B=K and P=K). In other words, if the first and the second constituent bit loads associated with the sub-carrier are not supported, the original bit load may be allocated to both the first and the second constituent bit loads. For example, the original bit load associated with a first sub-carrier of an original symbol may be 3 bits. Based on bit allocation operations described above, the bit load calculation unit 104 may determine the first and the second constituent bit loads associated with the first sub-carrier to be 2 bits and 1 bit, respectively. The bit load calculation unit 104 may then determine that only bit loads greater than or equal to 3 bits are supported, and therefore determine that the first and the second constituent bit loads associated with the first sub-carrier are not supported. Consequently, the bit load calculation unit 104 can allocate all 3 bits of the original bit load to the first constituent bit load and also to the second constituent bit load. Thus, the first constituent symbol will comprise all 3 bits of the original bit load modulated on the first sub-carrier. Likewise, the second constituent symbol will comprise all 3 bits of the original bit load modulated on the first sub-carrier. This results in a straight symbol copy where only time diversity may be exploited (as will be described in FIGS. 6-8), but the SNR margin may not be adjusted. For example, an original symbol may comprise 3 bits mapped to a sub-carrier. It may be determined that constituent bit loads (e.g., 2 bits, 1 bit) are not supported. Accordingly, all 3 bits of the original symbol may be mapped to the sub-carrier in the first constituent symbol and the second constituent symbol. The flow continues at block 416.

At block 416, for each sub-carrier, the first and the second constituent bit loads are recorded to indicate how to allocate bits of the original symbol across two constituent symbols for the sub-carrier. For example, the bit load calculation unit 104 records the first and the second constituent bit loads that are determined to be supported in block 408, or that are calculated in block 414. In one example, the bit load calculation unit 104 can provide an indication of the first and second constituent symbols after they are calculated for each of the sub-carriers to the symbol generation unit 106 to begin the bit allocation process. The flow continues at block 418.

At block 418, it is determined whether there exist additional sub-carriers of the original symbol to be analyzed. For example, the bit load calculation unit 104 determines whether the original symbol comprises additional sub-carriers to be analyzed. After the first and the second constituent bit loads are determined for each sub-carrier, tone maps associated with the constituent symbols can be determined. The tone map is a representation of bit loads for each of the sub-carriers. The symbol generation unit 106 can generate constituent symbols in accordance with the tone maps associated with the constituent symbols. If it is determined that there exist additional sub-carriers to be analyzed, the flow loops back to block 404 where the next sub-carrier is identified and operations described with reference to block 406-416 are executed for the next sub-carrier of the original symbol. Otherwise, the flow continues at block 420.

At block 420, one or more retransmission packets are generated. After the bit allocation unit 104 determines the first and the second constituent bit loads for the original bit load associated with each sub-carrier, the symbol generation unit 106 of FIG. 1 can allocate bits of the original one or more symbols to two constituent symbols per original symbol. The packet generation unit 108 can then allocate the constituent symbols to one or more retransmission packet as will be described in FIGS. 6-8. From block 420, the flow ends.

Figure 5:
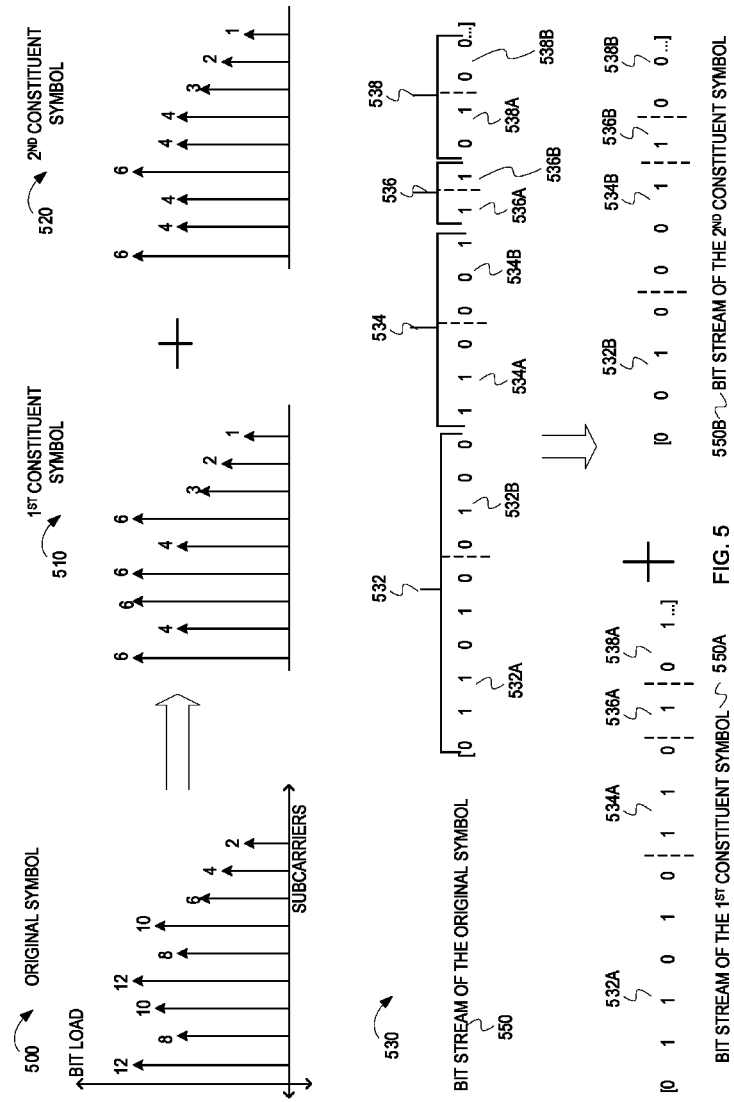
FIG. 5 is an example conceptual diagram illustrating bit load splitting in a spectral domain and a time domain.

FIG. 5 is an example conceptual diagram illustrating bit load splitting in a spectral domain. FIG. 5 depicts a tone (or sub-carrier) map 500 of an original OFDM symbol that indicates bit loading per sub-carrier. During the dynamic bit allocation process, the tone map 500 of the original OFDM symbol is split into two constituent tone maps 510 and 520 associated with a first constituent symbol and a second constituent symbol respectively. The tone maps 500, 510, and 520 illustrate how K-bit loading on the nth sub-carrier of the original OFDM symbol is spread to the nth sub-carrier of the two constituent OFDM symbols such that each constituent OFDM symbol has a bit load of approximately K/2. For example, the bit load calculation unit 104 determines, based on operations described above with reference to FIG. 4, that 12 bits on a first sub-carrier of the original OFDM symbol should be allocated such that 6 bits are mapped to the first sub-carrier of the first constituent symbol 510 and the remaining 6 bits are mapped to the first sub-carrier of the second constituent symbol 520. As another example, the bit load calculation unit 104 determines that 10 bits on a second sub-carrier of the original OFDM symbol 500 should be allocated such that 6 bits are mapped to the second sub-carrier of the first constituent symbol 510 and the remaining 4 bits are mapped to the second sub-carrier of the second constituent symbol 520. Such a bit allocation as depicted in FIG. 5 can improve SNR margin on a per-carrier basis. For example, dividing a 12-bit bit load across two constituent symbols (6 bits per constituent symbol) can result in an 18 dB increase in SNR margin for the sub-carrier based on the FEC rate and the BER.

FIG. 5 also depicts bit load splitting in a time domain 530. As depicted in FIG. 5, during the dynamic bit allocation process, the bit stream of the original symbol 550 is divided into a bit stream of the first constituent symbol 550A and a bit stream of the second constituent symbol 550B. The bit stream of the original symbol 550 comprises a set of ten bits 532 that are mapped to a first sub-carrier, a set of six bits 534 that are mapped to a second sub-carrier, a set of two bits 536 that are mapped to a third sub-carrier, and a set of four bits 538 that are mapped to a fourth sub-carrier. In accordance with the dynamic bit allocation determined by the bit load calculation unit 104 (described in FIG. 4), the symbol generation unit 106 of FIG. 1 divides the set of ten bits 532 that are mapped to the first sub-carrier into two constituent sets of bits 532A and 532B comprising six bits and four bits, respectively. The symbol generation unit 106 divides the set of six bits 534 that are mapped to the second sub-carrier into two constituent sets of bits 534A and 534B comprising three bits each. The symbol generation unit 106 divides the set of two bits 536 that are mapped to the third sub-carrier into two constituent sets of bits 536A and 536B comprising one bit each. The symbol generation unit 106 divides the set of four bits 538 that are mapped to the fourth sub-carrier into two constituent sets of bits 538A and 538B comprising two bits each. After dynamic bit allocation, the bit stream of the first constituent symbol 550A comprises the set of six bits 532A that are mapped to the first sub-carrier, the set of three bits 534A that are mapped to the second sub-carrier, one bit 536A that is mapped to the third sub-carrier, and the set of two bits 538A that are mapped to the fourth sub-carrier. Likewise, the bit stream of the second constituent symbol 550B comprises the set of four bits 532B that are mapped to the first sub-carrier, the set of three bits 534B that are mapped to the second sub-carrier, one bit 536B that is mapped to the third sub-carrier, and the set of two bits 538B that are mapped to the fourth sub-carrier. After the original bit stream 550 is allocated to the first constituent bit stream 550A and the second constituent bit stream 550B, one or more retransmission packets are generated as will be described below with reference to flow diagrams 6-7 and conceptual diagram 8.

Figure 6:
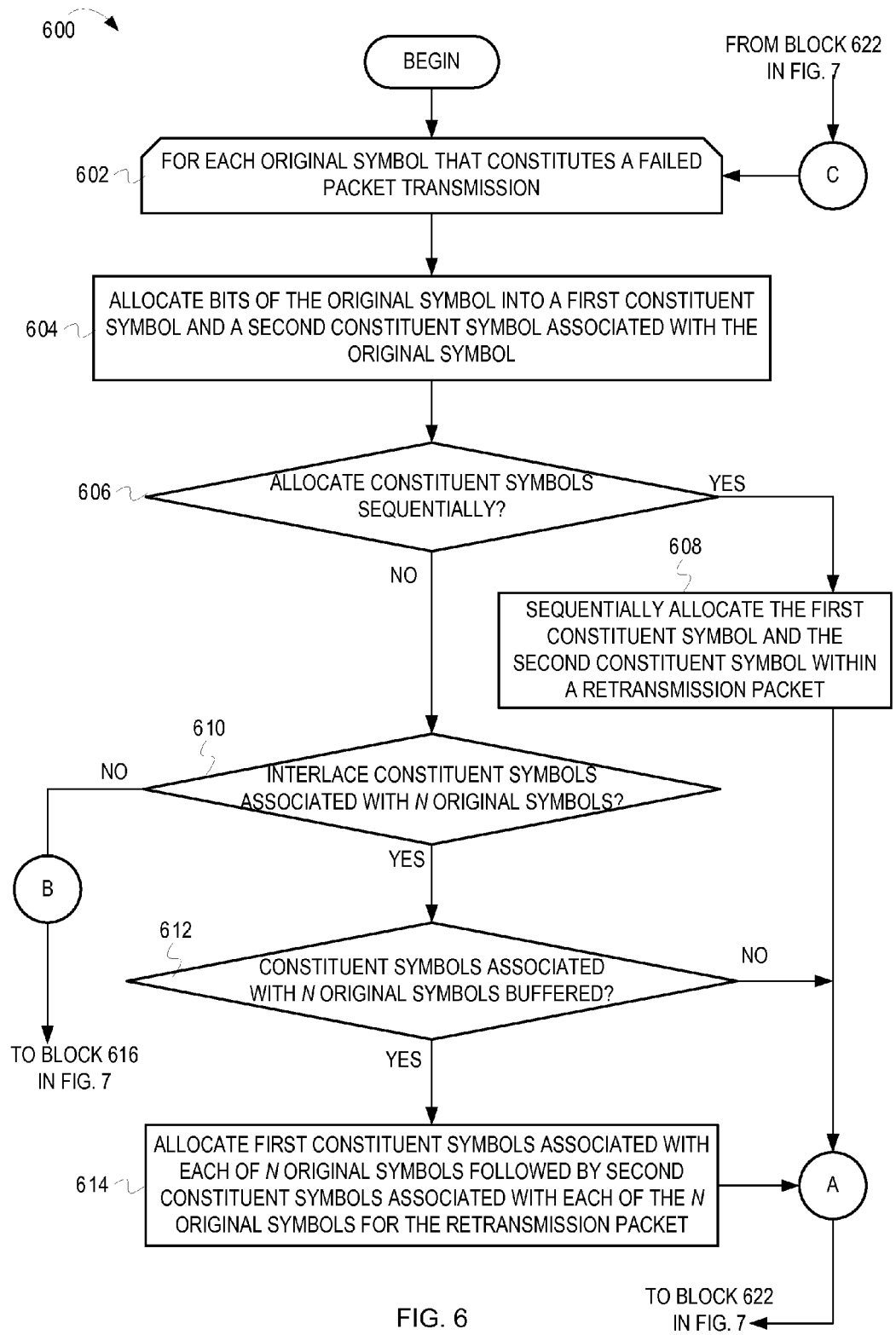
FIG. 6 depicts a flow diagram illustrating example operations for creating retransmission packets based on dynamic bit allocation.
Figure 7:
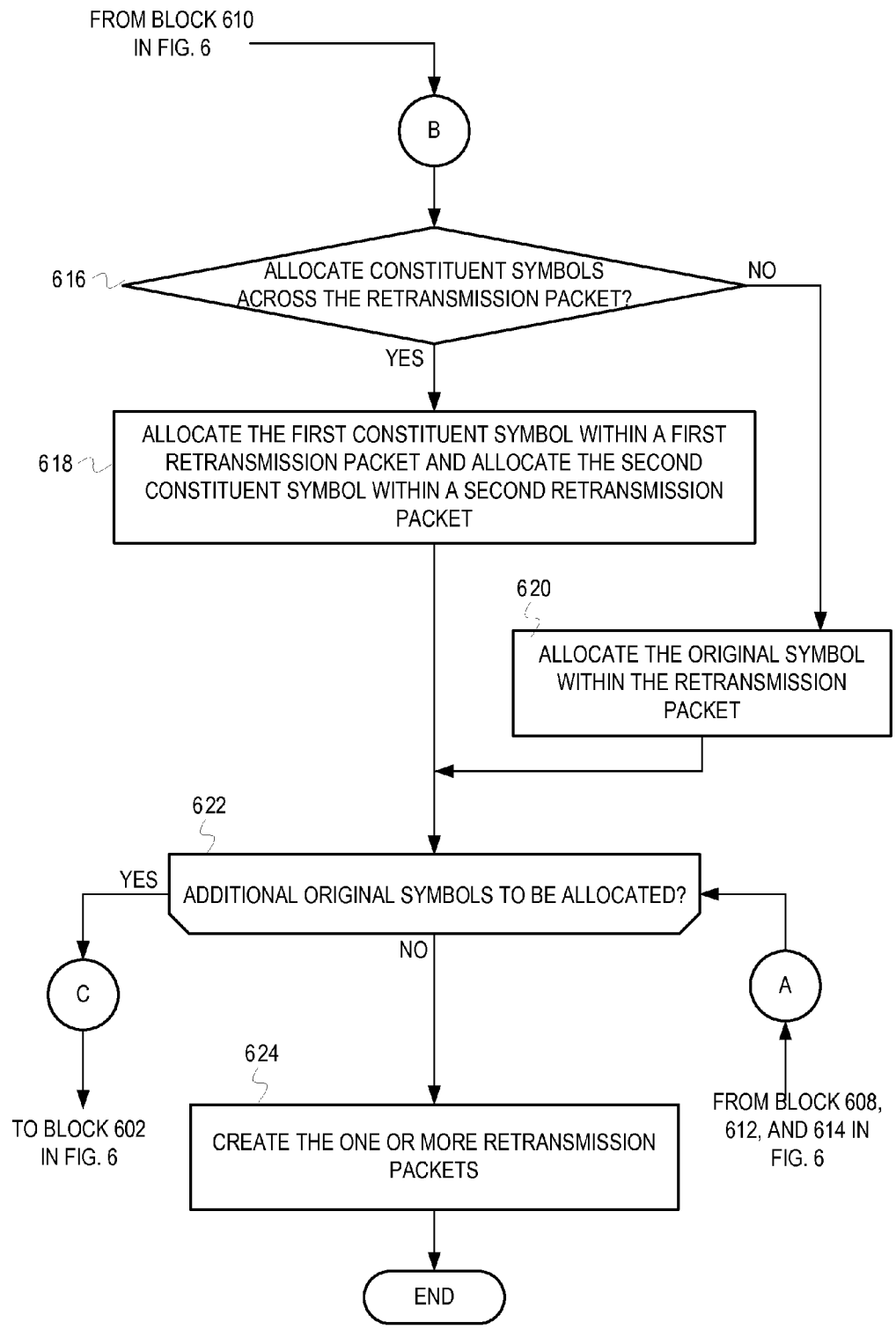
FIG. 7 is a continuation flow diagram of FIG. 6 and illustrates example operations for creating the retransmission packets based on dynamic bit allocation.

FIG. 6 and FIG. 7 depict a flow diagram 600 illustrating example operations for creating retransmission packets based on dynamic bit allocation. Flow 600 begins at block 602 in FIG. 6.

At block 602, a loop begins for each original symbol that constitutes a failed packet transmission. For example, the symbol generation unit 106 of FIG. 1 performs operations of block 604 to generate two constituent symbols for each original symbol. The packet generation unit 108 of FIG. 1 performs operations described with reference to blocks 606-622 to allocate the constituent symbols to one or more retransmission packets. The flow continues at block 604.

Figure 8:
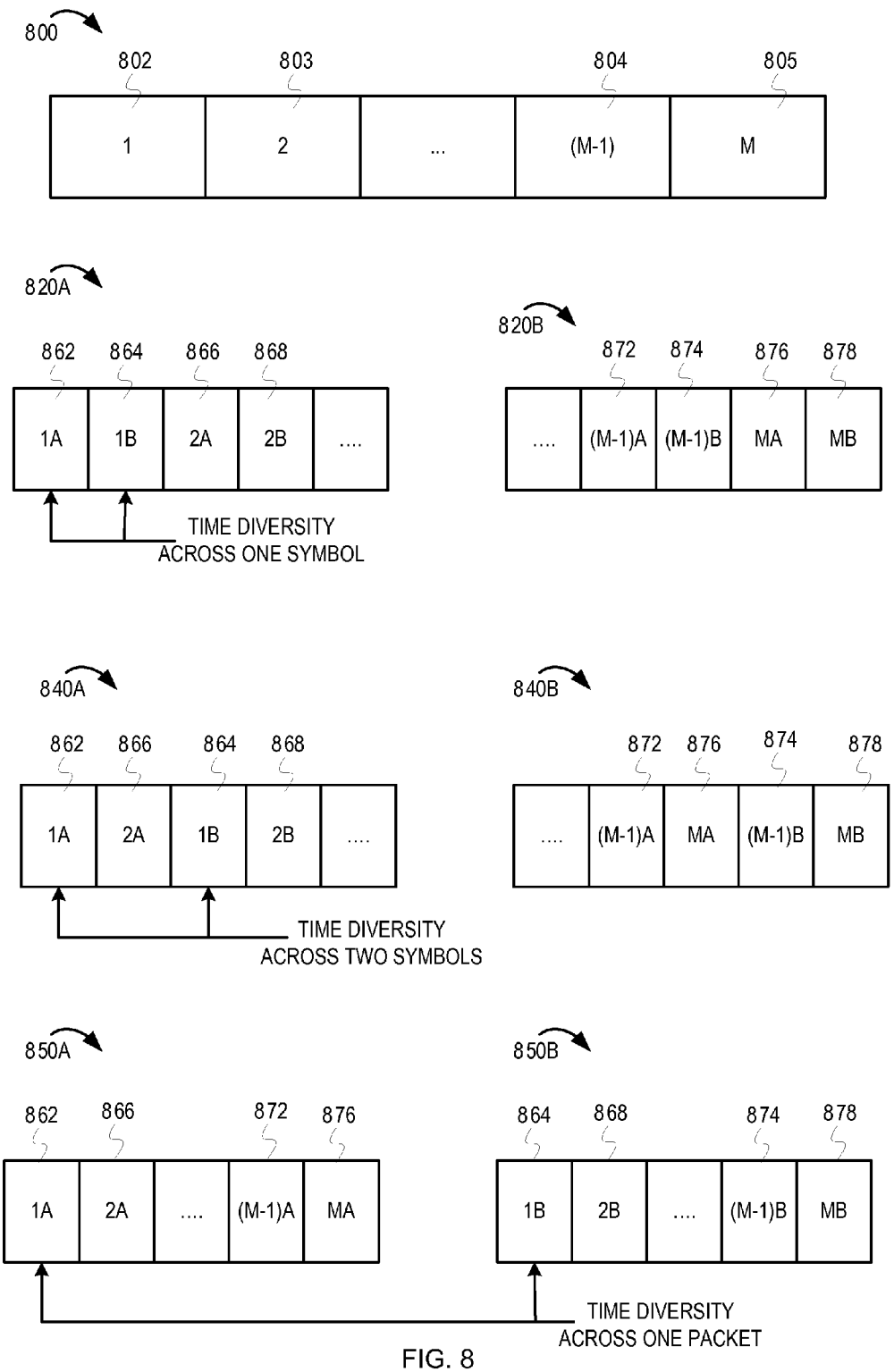
FIG. 8 is an example conceptual diagram illustrating allocation of constituent symbols to retransmission packets.

At block 604, the bits of each of the original symbols are allocated to form a first constituent symbol and a second constituent symbol associated with the original symbol. For example, the symbol generation unit 106 allocates bits of each of the original symbols to form the first constituent symbol and the second constituent symbol. As described with reference to FIGS. 4-5, the symbol generation unit 106 allocates bits of each of the original symbols to form the first and the second constituent symbols based, at least in part, on the constituent bit loads associated with each of the sub-carriers of each of the original symbols. As illustrated by FIG. 8, the original packet 800 comprises the original symbol 802 (symbol 1), the original symbol 803 (symbol 2), original symbol 804 (symbol M-1), and the original symbol 805 (symbol M). On determining that transmission of the original packet 800 failed, the symbol generation unit 106, in conjunction with the bit load calculation unit 104, can allocate bits of each of the original symbols to generate two constituent symbols associated with each of the original symbols, as was illustrated in FIGS. 4-5. In FIG. 8, the original symbol 802 is split into constituent symbols 862 and 864 (depicted as symbols 1A and 1B, respectively). The original symbol 803 is split into constituent symbols 866 and 868 (depicted as symbols 2A and 2B, respectively). The original symbol 804 is split into constituent symbols 872 and 874 (depicted as symbols (M-1)A and (M-1) B, respectively) and the original symbol 805 is split into constituent symbols 876 and 878 (depicted as symbols MA and MB, respectively). After the symbol generation unit 106 generates the constituent symbols associated with the original symbol, the packet generation unit 108 can allocate the constituent symbols to one or more retransmission packets for time diversity. The flow continues at block 606.

At block 606, it is determined whether the constituent symbols are to be allocated sequentially. For example, the packet generation unit 108 can determine whether the first and the second constituent symbols associated with each of the original symbols are to be allocated sequentially within a retransmission packet. Sequential allocation of the constituent symbols results in the least time diversity. However, sequential allocation also requires minimum buffering at the transmitting network device 150 and at the receiving network device 160 because the bits of each of the original symbols are divided and recombined on a symbol-by-symbol basis. If it is determined that the constituent symbols are to be allocated sequentially, the flow continues at block 608. Otherwise, the flow continues at block 610.

At block 608, the first constituent symbol and the second constituent symbol are allocated sequentially within the retransmission packet. For example, the packet generation unit 108 can sequentially allocate the first constituent symbol and the second constituent symbol within the retransmission packet. Sequential allocation of the first and the second constituent symbols within the retransmission packet is further illustrated by FIG. 8. Packet 820A and packet 820B represent retransmission packets formed from the constituent symbols 862-878. As depicted in the retransmission packet 820A, the first constituent symbol 862 and the second constituent symbol 864 of the original symbol 802 are transmitted successively. Next, the second original symbol 803 is processed and the first constituent symbol 866 and the second constituent symbol 868 of the original symbol 803 are transmitted. This process is repeated for all the original symbols. It is noted that although FIG. 8 depicts the constituent symbols being sequentially allocated within two retransmission packets 820A and 820B, embodiments are not so limited. In some implementations, when the constituent symbols are sequentially allocated, the constituent symbols may be transmitted in one retransmission packet if the combined size of the constituent symbols associated with all of the original symbols does not exceed a predefined maximum packet size as will be described below. Bit allocation across sequential symbols can achieve a time diversity of one symbol length, since the bits associated with the $n^{th}$ sub-carrier of the first constituent symbol are separated by one symbol length from the bits associated with the $n^{th}$ sub-carrier of the second constituent symbol. Bit allocation across sequential symbols may be implemented to mitigate intense interference spikes with low temporal correlation. Referring back to FIG. 6, the flow continues at block 622 in FIG. 7.

At block 610 in FIG. 6, if the constituent symbols should not be sequentially allocated, it is determined whether the constituent symbols associated with N original symbols should be interlaced. For example, the packet generation unit 108 can determine whether to interlace constituent symbols associated with N original symbols. In some cases, N is less than or equal to a maximum length of a retransmission packet. Thus, if M represents the maximum length (in symbols) of the retransmission packet, the constituent symbols associated with each of N original symbols can be interleaved where $1 \leq N \leq M$. In other words, as will be described below, the first and the second constituent symbols of a first original symbol are allocated within the retransmission packet so that the first and the second constituent symbols are separated by N other constituent symbols respectively associated with N original symbols. To interlace constituent symbols associated with N original symbols, N symbols are buffered to generate the retransmission packet with a size of M symbol lengths. Interlacing constituent symbols associated with N original symbols is illustrated in FIG. 8. Packet 840A and packet 840B represent retransmission packets generated by interlacing constituent symbols associated with two original symbols. Referring back to FIG. 6, if it is determined that the constituent symbols associated with N original symbols should be interlaced, the flow continues at block 612. Otherwise, the flow continues at block 616 in FIG. 7.

At block 612, it is determined whether the constituent symbols associated with the N original symbols are buffered. For example, the packet generation unit 108 can determine whether the constituent symbols associated with the N original symbols are buffered. To interlace the constituent symbols associated with N original symbols, the first constituent symbols associated with N original symbols are transmitted first followed by the second constituent symbols associated with the N original symbols. In other words, referring to the two symbol interlacing of FIG. 8 (i.e., where N=2), the second constituent symbol 864 associated with the original symbol 802 cannot be transmitted unless the first constituent symbol 866 of the original symbol 803 is transmitted. The condition of block 612 determines whether all the first constituent symbols of the N original symbols are available. If it is determined that the constituent symbols associated with the N original symbols are buffered, the flow continues at block 614. Otherwise, the flow continues at block 622 in FIG. 7, where the next original symbol is divided into its constituent symbols and it is determined whether all the constituent symbols associated with N original symbols are available.

At block 614, the first constituent symbols associated with each of the N original symbols are allocated for the retransmission packet, followed by the second constituent symbols associated with each of the N original symbols. For example, the packet generation unit 108 allocates the first constituent symbols associated with each of the N original symbols followed by second constituent symbols associated with each of the N original symbols for the retransmission packet. The flow 600 moves from block 612 to block 614 if it is determined that all the constituent symbols associated with the N original symbols are available. Referring to FIG. 8, as depicted in the retransmission packet 840A, the first constituent symbol 862 of the original symbol 802 is transmitted first, followed by the first constituent symbol 866 of the original symbol 803. For interlacing across two original symbols (i.e., where N=2), the second constituent symbol 864 of the original symbol 802 is transmitted next, followed by the second constituent symbol 868 of the original symbol 803. Interleaving constituent symbols across N original symbols can provide variable time diversity depending on the value of N. The flow continues at block 622 in FIG. 7.

At block 616 in FIG. 7, it is determined whether the constituent symbols should be allocated across the retransmission packet. The flow 600 moves from block 610 in FIG. 6 to block 616 in FIG. 7 if it is determined that the constituent symbols associated with N original symbols should not be interlaced and that the constituent symbols should not be allocated sequentially. For example, the packet generation unit 108 determines whether to allocate the constituent symbols of the original symbol across the retransmission packet. Allocating the first and the second constituent symbols of the original symbol across two different packets achieves greater time diversity than both interlacing symbols and sequentially allocating symbols. However, allocating constituent symbols across the retransmission packet can necessitate the transmitting network device 150 and the receiving network device 160 to buffer constituent symbols associated with M original symbols, where M is the maximum length of the retransmission packet (in symbols). If it is determined that the constituent symbols should be allocated across the retransmission packet, the flow continues at block 618. Otherwise, the flow continues at block 620.

At block 618, the first constituent symbol of each of the original symbols is allocated to a first retransmission packet and the second constituent symbol of each of the original symbols is allocated to a second retransmission packet. For example, the packet generation unit 108 allocates the first constituent symbol of each of the original symbols to the first retransmission packet and the second constituent symbol of each of the original symbols to the second retransmission packet. FIG. 8 further illustrates allocating the constituent symbols to different retransmission packets. Packet 850A and packet 850B represent retransmission packets generated by allocating the constituent symbols of an original symbol to different retransmission packets. As depicted in FIG. 8, the retransmission packet 850A comprises the first constituent symbols 862, 866, 872, and 876 of the original symbols 802, 803, 804, and 805 respectively. The retransmission packet 850B comprises the second constituent symbols 864, 868, 874, and 878 of the original symbols 802, 803, 804, and 805 respectively. Allocating the constituent symbols across two retransmission packets can result in a time diversity of one packet length. Bit allocation across two retransmission packets may be implemented to maximize the time diversity for strongly time-correlated interference. The flow continues at block 622.

At block 620, the original symbol is allocated to the retransmission packet. For example, the packet generation unit 108 allocates the original symbol to the retransmission packet. The flow 600 moves from block 616 in FIG. 7 to block 620 if it is determined that the constituent symbols should not be allocated sequentially, that constituent symbols associated with N original symbols should not be interlaced, and that constituent symbols should not be allocated to separate retransmission packets. In one implementation, the packet generation unit 108 can retransmit the original packet without implementing operations for bit allocation as described herein. The flow continues at block 622.

At block 622, it is determined whether there exist additional original symbols to be allocated. For example, the packet generation unit 108 determines whether there exist additional symbols to be allocated to one or more retransmission packets. The flow 600 moves from block 608 of FIG. 6, from block 614 of FIG. 6, or from block 618 of FIG. 7 after the constituent symbols associated with the original symbol are allocated within one or more retransmission packets. The flow 600 also moves from block 620 of FIG. 7, to block 622 after the original symbols are reallocated within one or more retransmission packets. Additionally, the flow 600 also moves from block 612 of FIG. 6 to block 622 of FIG. 7 if it is determined that constituent symbols associated with N original symbols are not buffered. If it is determined that there exist additional original symbols to be allocated, the flow loops back to block 602 where a next original symbol is identified and some/all of the operations described with reference to blocks 604-620 are performed for the next original symbol. If it is determined that there are no additional original symbols to be allocated, the flow continues at block 624.

At block 624, the one or more retransmission packets are created. For example, the packet generation unit 108 creates the one or more retransmission packets. The packet generation unit 108 can encapsulate the allocated symbols to form the one or more retransmission packets. From block 624, the flow ends.

Although FIGS. 1-8 describe the bit allocation unit 110 allocating the bits of the original symbol across two constituent symbols, embodiments are not so limited. In some implementations, the bit allocation unit 110 can allocate the bits of the original symbol across any suitable number of constituent symbols. For example, the bit allocation unit 110 can allocate the bits of the original symbol across three constituent symbols. The number constituent symbols per original symbol may be determined based on knowledge of a requisite throughput, a threshold SNR margin, a threshold bit load, etc. It is also noted that in some implementations, time diversity across more than one packet may also be achieved by transmitting a first constituent symbol in a first retransmission packet and transmitting a second constituent symbol in a third (or $N^{th}$) retransmission packet.

It is noted that although block 612 in FIG. 6 describes buffering constituent symbols for interlacing across N constituent symbols, embodiments are not so limited. In some implementations, only the second constituent symbols may be buffered and the first constituent symbols may be provided for transmission as they are generated. For example, to interlace constituent symbols across 2 original symbols, the first original symbol may be split into its constituent symbols. The first constituent symbol of the first original symbol may be provided for transmission and the second constituent symbol of the first original symbol may be buffered. Next, the second original symbol may be split into its constituent symbols. The first constituent symbol of the second original symbol may be provided for transmission and the second constituent symbol of the second original symbol may be buffered. Following this, the second constituent symbol of the first original symbol and the second constituent symbol of the second original symbol may be retrieved from the buffer and may be provided for transmission.

It is also noted that although FIG. 8 depicts the constituent symbols of the original symbols being allocated to two retransmission packets, embodiments are not so limited. If a transmission is short and within the confines of a single retransmission packet with a predefined maximum packet length (e.g., depending on communication channel coherence time), the constituent symbols may be transmitted in one retransmission packet. For example, with reference to FIG. 8, if the constituent symbols 862-878 can be sequentially allocated in a single retransmission packet, only a single retransmission packet 820A comprising the constituent symbols 862-878 may be transmitted in lieu of two retransmission packets as depicted in FIG. 8. This can improve transmission efficiency because the overhead (e.g., packet headers) is only for a single retransmission packet and not for two retransmission packets. In other words, sequential or interlaced symbol allocation can be implemented within one retransmission packet if the length of the original packet is small enough to accommodate doubling of the symbols to be retransmitted but still not exceed the maximum packet length.

If $t_o$ is the overhead time of the packet (i.e., total time where non-data symbols are transmitted), $t_D$ is the data time of the packet (i.e., total time where data symbols are transmitted), and $t_{D\_MAX}$ is the maximum data time of the packet, then Eq. 2 represents the total packet transmit time ($t_p$).

$$t_p = t_o + t_D \qquad \text{Eq. 2}$$

If $$t_p < \frac{t_{D\_MAX}}{2},$$

twice the number of original symbols (i.e., all of the constituent symbols) can be transmitted in a single retransmission packet without exceeding the maximum packet time of $t_o+t_{D\_MAX}$. For example, if the maximum length of a packet is 10 symbols and three original symbols were transmitted in the original packet, a single retransmission packet with six constituent symbols can be transmitted. However, if the maximum length of a packet is 10 symbols and six original symbols were transmitted the original packet, the twelve constituent symbols have to be transmitted across two retransmission packets (e.g., six symbols per retransmission packet, ten symbols in a first retransmission packet and two symbols in a second retransmission packet, etc.).

Figure 9:
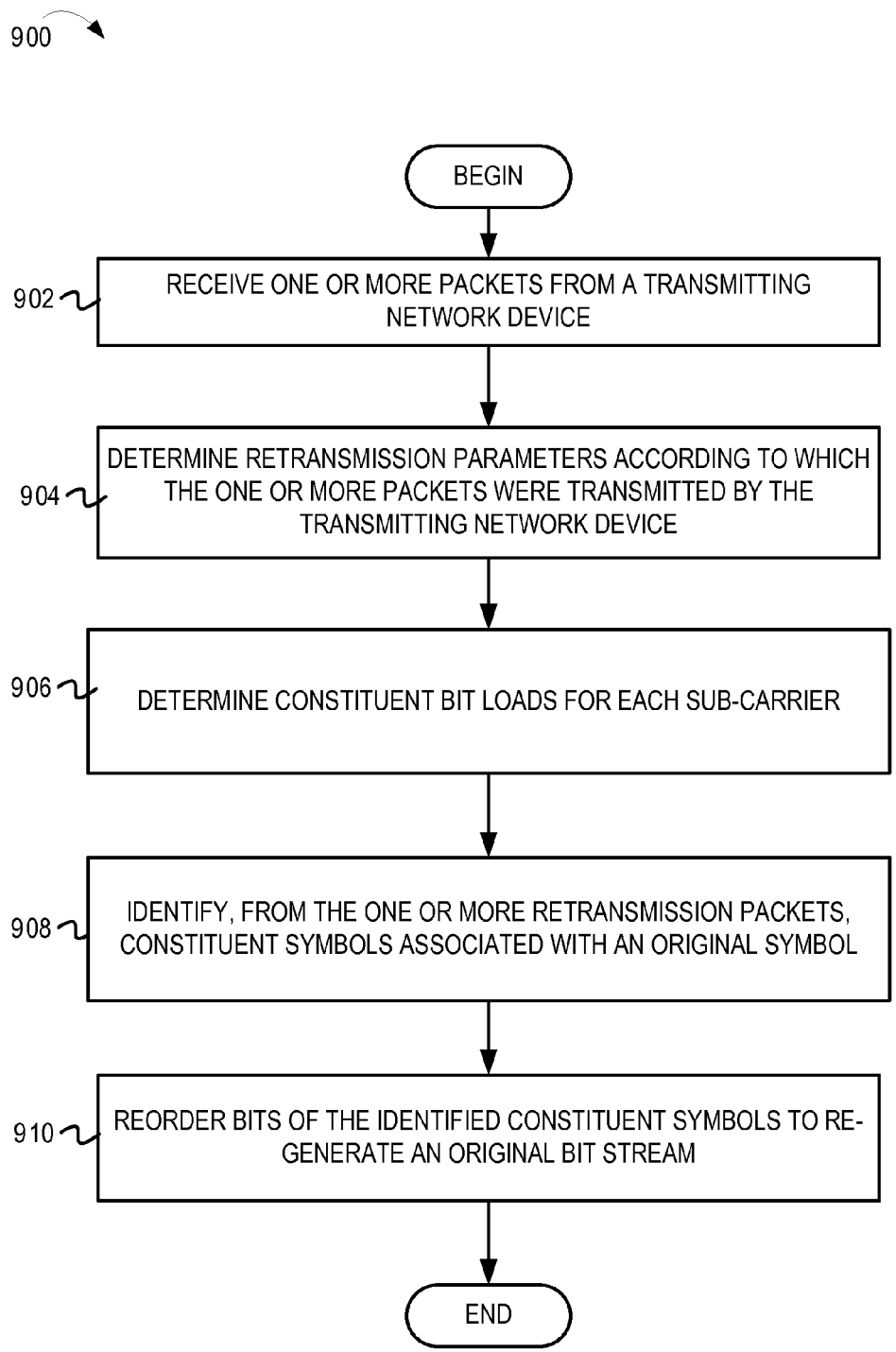
FIG. 9 is a flow diagram illustrating example operations of a receiving network device for generating an original bit stream from retransmission packets.

FIG. 9 is a flow diagram 900 illustrating example operations of a receiving network device for generating an original bit stream from retransmission packets. The flow 900 begins at block 902.

At block 902, one or more retransmission packets are received from a transmitting network device. For example, the receiving network device 160 of FIG. 1 receives the one or more retransmission packets from the transmitting network device 150. For example, the receiving network device 160 may receive the one or more retransmission packets in response to transmitting a NACK to the transmitting network device indicating that an original packet was incorrectly received. The receiving network device 160 may also receive the one or more retransmission packets in response to transmitting an indication that a BER of a communication channel is above a threshold BER. The flow continues at block 904.

At block 904, the retransmission parameters according to which the one or more retransmission packets were transmitted by the transmitting network device 150 are determined. For example, the bit load reconstruction unit 122 of FIG. 1 determines the retransmission parameters according to which the one or more retransmission packets were transmitted by the transmitting network device 150. In some implementations, in addition to indicating that the transmission of the original packet failed, the bit extraction unit 118 of the receiving network device 160 can also communicate retransmission parameters to the bit allocation unit 110 of the transmitting network device 150. For example, the retransmission parameters can indicate how the symbols should be allocated to the one or more retransmission packets for time diversity, a threshold bit load for each sub-carrier of constituent symbols, etc. In some implementations, the bit extraction unit 118 may not explicitly transmit the retransmission parameters to the bit allocation unit 110. Instead, both the bit extraction unit 118 and the bit allocation unit 110 may perform bit allocation and bit extraction, respectively, based on a set of default retransmission parameters. The bit extraction unit 118 processes the received one or more retransmission packets in accordance with the retransmission parameters. The flow continues at block 906.

At block 906, the constituent bit loads for each sub-carrier of each constituent symbol are determined. For example, the bit load calculation unit 120 of the receiving network device 160 can determine constituent bit loads associated with each sub-carrier of each constituent symbol of the retransmission packets. Based on knowledge of an original tone map (e.g., an original bit load allocated to each sub-carrier of the original symbol) agreed upon during a channel estimation process, the bit load calculation unit 120 can construct tone maps corresponding to the constituent symbols. The bit load calculation unit 120 can perform the operations described with reference to FIG. 4 to determine how the bit allocation unit 110 allocated bits to generate the constituent symbols. The bit load reconstruction unit 122 can de-allocate the bits of the one or more retransmission packets based, in part, on the output of the bit load calculation unit 120 (i.e., the determined tone maps corresponding to the constituent symbols), and on other retransmission parameters, to recover the original bit stream as will be described with reference to blocks 908-910. The flow continues at block 908.

At block 908, the constituent symbols associated with an original symbol are identified from the one or more retransmission packets. For example, the bit load reconstruction unit 122 can identify the constituent symbols associated with the original symbol from the one or more retransmission packets. Depending on the retransmission parameters, one or more received constituent symbols may be buffered before the bit load reconstruction unit 122 can identify the constituent symbols associated with a specified original symbol. For example, if bit allocation was implemented across sequential symbols, the bit extraction unit 118 can receive, process, and buffer the first constituent symbol of the original symbol. The bit extraction unit 118 can receive, process, and combine the second constituent symbol of the original symbol with the buffered first constituent symbol to generate the original symbol. As another example, if constituent symbols associated with N original symbols were interlaced, the receiving network device 160 can receive, process, and buffer the first N constituent symbols. The $(N+1)^{th}$ symbol is the second constituent symbol of the first original symbol. The bit load reconstruction unit 122 can combine the $(N+1)^{th}$ symbol with the buffered first constituent symbol of the original symbol and regenerate the original bit stream associated with the first original symbol. In general, the bit load reconstruction unit 122 can combine the $(N+i)^{th}$ received symbol with the buffered $i^{th}$ received symbol to regenerate the original bit stream. As another example, if constituent symbols of an original symbol were allocated to different retransmission packets, the receiving network device 160 can receive, process, and buffer all the symbols in a first retransmission packet (i.e., first constituent symbols of the original symbols). The first symbol of the second retransmission packet is the second constituent symbol of the first original symbol. The bit load reconstruction unit 122 can combine the first symbol of the second retransmission packet with the buffered first symbol of the first retransmission packet and regenerate the original bit stream associated with the first original symbol. In general, if M denotes the length of the retransmission packet, the bit load reconstruction unit 122 can combine the $(M+i)^{th}$ received symbol with the buffered $i^{th}$ received symbol to regenerate the original bit stream. The flow continues at block 910.

At block 910, the bits of the identified constituent symbols are reordered to re-generate the original bit stream. For example, the bit load reconstruction unit 122 regenerates the original bit stream based, at least in part, on knowledge of the constituent bit loads associated with each sub-carrier of each original symbol and based on the retransmission parameters. For example, based on the retransmission parameters communicated by the receiving network device 160 to the transmitting network device 150, the bit extraction unit 118 has prior knowledge of the how the bit allocation unit 110 will allocate bits of the original symbols to the constituent symbols and to the retransmission packets. For example, as part of the NACK packet, the receiving network device 160 may indicate that the bits of the original symbols should be allocated to constituent symbols in accordance with operations of FIG. 4 and that the constituent symbols should be allocated sequentially in the retransmission packet. On receiving the retransmission packet, the bit extraction unit 118 can, based on the retransmission parameters previously indicated to the transmitting network device 150, reconstruct the original bit stream. After the original bit stream is re-generated, the bit extraction unit 122 can provide the original bit stream for further processing (e.g., de-interleaving, etc.). From block 910, the flow ends.

As described above, if an original bit load cannot be split into constituent bit loads that are supported (e.g., an original bit load of 1 bit may not be split into constituent bit loads of ½ bit or lower if fractional bit loading is not supported), the original bit load of the sub-carrier may be replicated across both constituent symbols (on the same sub-carrier). Replicating the original bit load of a sub-carrier (as described in block 414 of FIG. 4) can require the bit load reconstruction unit 122 to determine which bits have been replicated, to determine whether the bits were accurately received, to determine which copy of the bits is accurate, etc. As will be described with reference to FIGS. 10-11, operations for bit allocation as described with reference to FIGS. 1-9 can further include forcing a predetermined SNR margin limit for the sub-carriers. As described in FIGS. 10-11, the sub-carriers that do not meet the predetermined SNR margin limit can be discarded and the bit load of the discarded sub-carriers can be redistributed across the one or more other sub-carriers.

Figure 10:
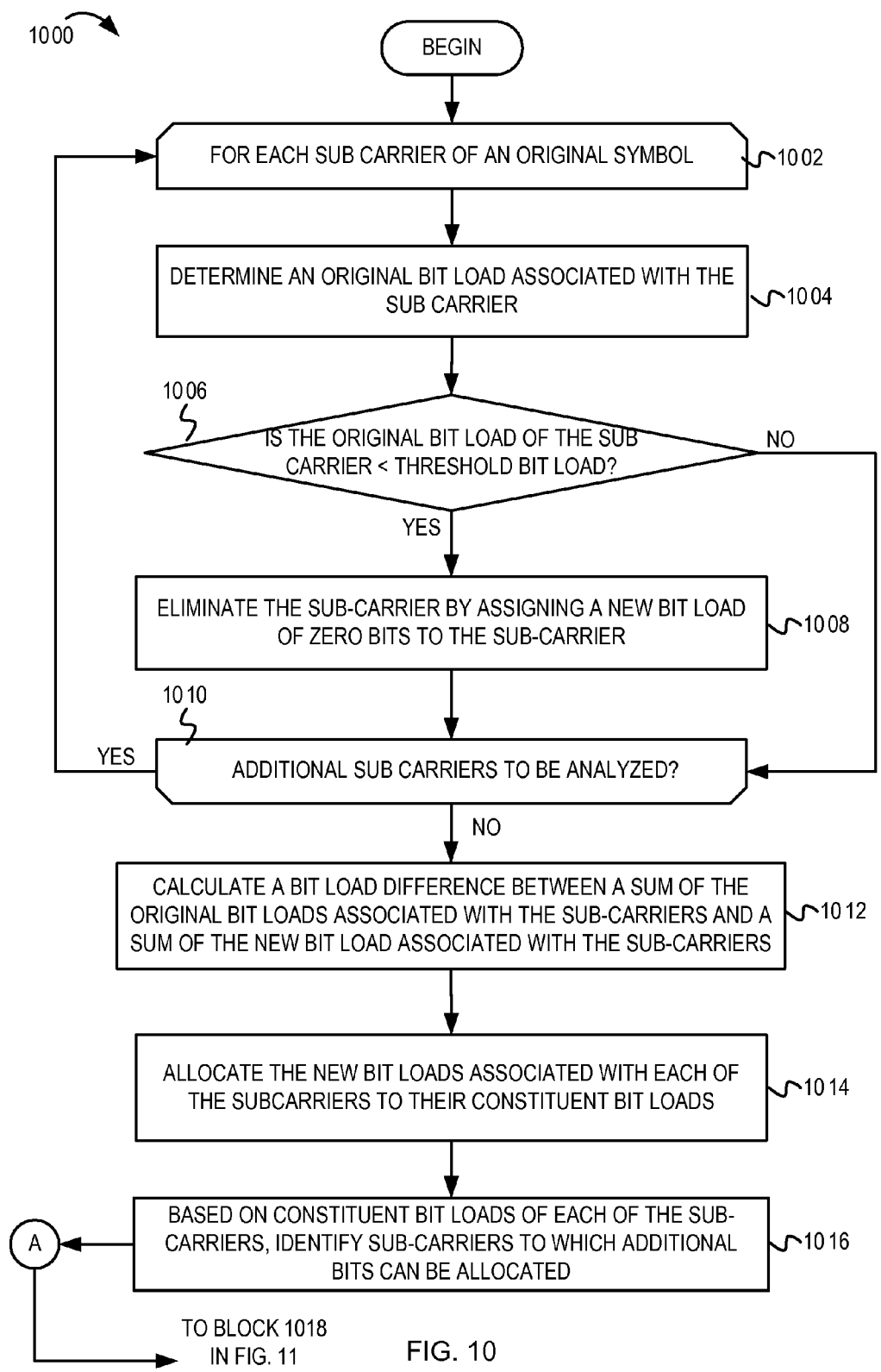
FIG. 10 is a flow diagram illustrating example operations for dynamic bit load allocation based on a predetermined SNR margin limit.
Figure 11:
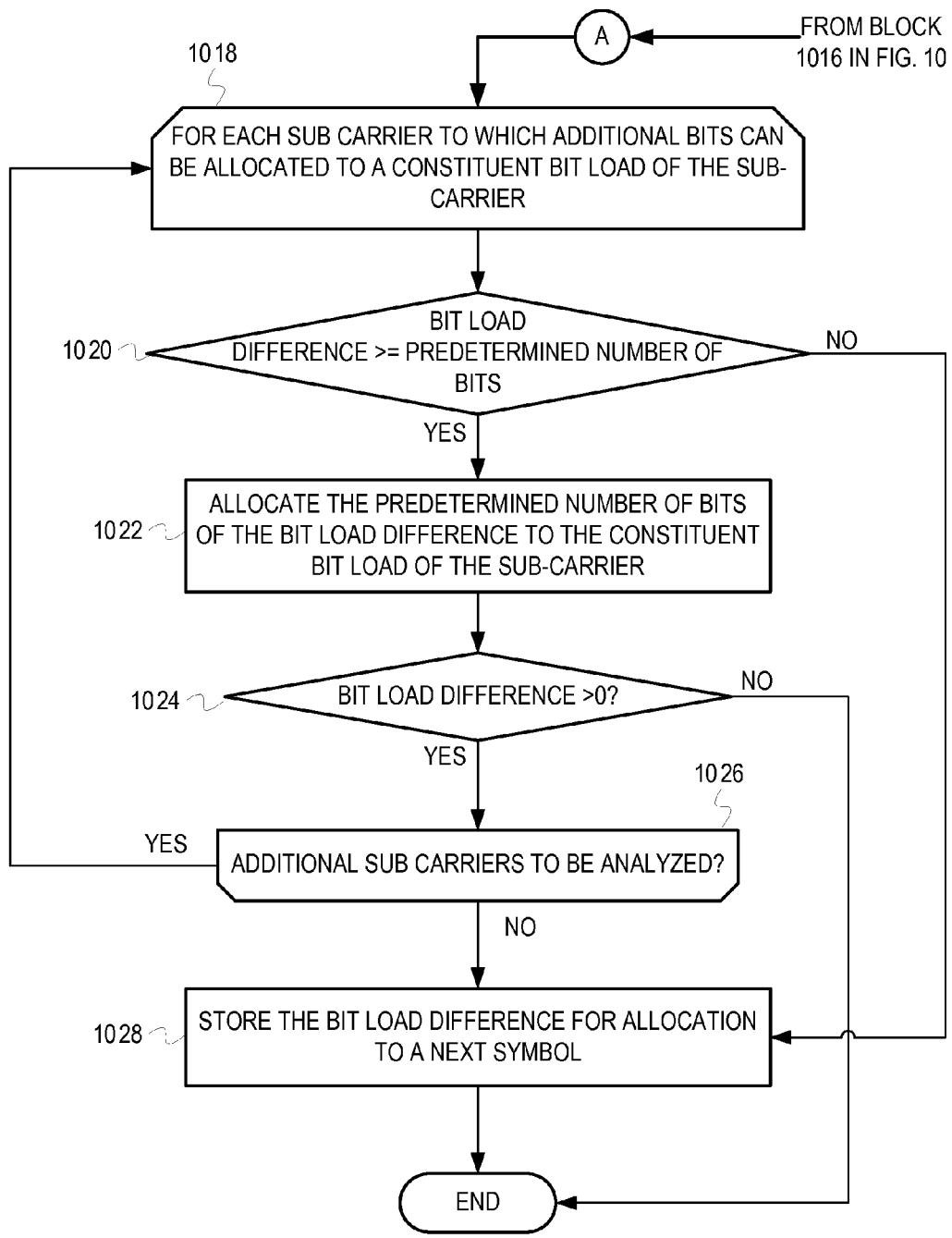
FIG. 11 is a continuation flow diagram of FIG. 10 and also illustrates example operations for dynamic bit load allocation based on the predetermined SNR margin limit.

FIG. 10 and FIG. 11 depict a flow diagram 1000 illustrating example operations for bit load allocation based on a predetermined SNR margin limit. The flow 1000 begins at block 1002 in FIG. 10.

At block 1002, a loop begins for each sub-carrier of an original symbol. For example, the bit load calculation unit 104 of FIG. 1 executes the operations described with reference to blocks 1004-1008 for each sub-carrier of the original symbol. The flow continues at block 1004.

At block 1004, for each sub-carrier of the original symbol, an original bit load associated with the sub-carrier is determined. For example, the bit load calculation unit determines the original bit load associated with the sub-carrier. Similarly, as was described above with reference to FIG. 1 and FIG. 4, the original bit load associated with the sub-carrier can be determined from an original tone map agreed upon by the transmitting network device 150 and the receiving network device 160 of FIG. 1 during a communication channel estimation process. The flow continues at block 1006.

At block 1006, for each sub-carrier, it is determined whether the original bit load associated with the sub-carrier is less than a threshold bit load. For example, the bit load calculation unit 104 can determine whether the original bit load associated with the sub-carrier is less than the threshold bit load. In some implementations, the threshold bit load may be an average bit load calculated across all the sub-carriers that constitute an OFDM waveform. The condition at block 1006 enables the bit load calculation unit 104 to identify sub-carriers that are relatively weak (e.g., are incapable of supporting a high bit load, have a small SNR margin or a high noise floor, etc.). For example, the threshold bit load may be 6 bits. Thus, only the sub-carriers that support 6 or more bits might be loaded. As will be described below, the bit load calculation unit 104 can eliminate the weak sub-carriers to improve the possibility of successful packet retransmission. In the above example, the bit load calculation unit 104 can eliminate the sub-carriers with a bit load less than 6 bits. It is noted that the transmitting network device 150 and the receiving network device 160 can agree upon the threshold bit load, the SNR margin threshold, and the order in which the bits of eliminated sub-carriers should be reallocated so that the bit extraction unit 118 can properly reconstruct the original bit stream (as will be further described below). If it is determined that the original bit load associated with the sub-carrier is less than the threshold bit load, the flow continues at block 1008. Otherwise, the flow continues at block 1010.

At block 1008, for each sub-carrier, if the original bit load associated with the sub-carrier is less than the bit load threshold, the sub-carrier is eliminated. For example, the bit load calculation unit 104 can eliminate the sub-carrier by assigning a new bit load of zero bits to the sub-carrier. It is noted that if the original bit load associated with the sub-carrier is greater than or equal to the bit load threshold, the bit load calculation unit 104 can assign the original bit load to the new bit load of the sub-carrier. For example, the bit load calculation unit 104 may determine that the original bit load of a first sub-carrier is 1. Accordingly, the bit load calculation unit 104 can determine that the original bit load of the first sub-carrier is less than a threshold bit load (e.g., 4 bits) and can indicate that the first sub-carrier is to be eliminated. This is indicated by allocating a new bit load of zero bits to the sub-carrier. The bit load originally allocated to the first sub-carrier can be reallocated to other sub-carriers as will be described with reference to blocks 1016-1028. The bit load calculation unit 104 may also notify the symbol generation unit 106 that the sub-carrier is to be eliminated. The symbol generation unit 106, in turn, can generate an OFDM symbol without modulating a subset of bits on the eliminated sub-carrier. The flow continues at block 1010.

At block 1010, it is determined whether there exist additional sub-carriers of the original symbol to be analyzed. For example, the bit load calculation unit 104 determines whether the original symbol includes additional sub-carriers to be analyzed. The flow 1000 also moves from block 1006 to block 1010 if it is determined that the original bit load of the sub-carrier is greater than or equal to the threshold bit load. If it is determined that there exist additional sub-carriers to be analyzed, the flow continues at block 1002, where a next sub-carrier associated with the original symbol is identified and it is determined whether an original bit load of the next sub-carrier is less than the threshold bit load. If it is determined that there do not exist additional sub-carriers to be analyzed, the flow continues at block 1012.

At block 1012, a bit load difference between a sum of the original bit loads associated with the sub-carriers of the original symbol and a sum of the new bit loads associated with the sub-carriers of the original symbol is determined. For example, the bit load calculation unit 104 determines the bit load difference. The bit load difference ($B_d$) can be calculated as depicted by Eq. 3.

$$B_d = \sum_{i=1}^{M} tonemap(i) - \sum_{i=1}^{M} tonemap_{new(i)} \qquad \text{Eq. 3}$$

In Eq. 3, M is the total number of sub-carriers, tonemap(i) represents an original bit load of the $i^{th}$ sub-carrier, and tonemap new(i) represents a new bit load of the $i^{th}$ sub-carrier. For each sub-carrier, the new bit load of the sub-carrier is different from the original bit load of the sub-carrier if the original bit load of the sub-carrier was less than the threshold bit load. The bit load difference indicates a number of bits that were originally mapped to sub-carriers that did not meet the threshold bit load. The bit load difference indicates a number of bits that should be reallocated to one or more other sub-carriers of the original symbols that did meet the threshold bit load. The bit load calculation unit 104 can determine how the bit load difference is to be allocated to the other sub-carriers as will be described with reference to blocks 1018-1028 of FIG. 11. The bit load calculation unit 104 can also notify other processing components (e.g., the symbol generation unit 106) of how the bit load of the eliminated sub-carrier is to be allocated to other sub-carriers. The flow continues at block 1014.

At block 1014, the new bit loads associated with each of the sub-carriers are allocated to constituent bit loads associated with respective ones of the sub-carriers. In one implementation, the bit load calculation unit 104 can execute operations described with reference to FIG. 4 to allocate the new bit loads associated with each of the sub-carriers to their constituent bit loads. In another implementation, the bit load calculation unit 104 can allocate the new bit loads associated with the sub-carriers to constituent bit loads in accordance with a predefined set of rules (e.g., pre-calculated with reference to the flow 400 of FIG. 4). For example, if the new bit load associated with a first sub-carrier is 10 bits, the bit load calculation unit 104 may allocate 6 bits to a first constituent bit load associated with the first sub-carrier and 4 bits to a second constituent bit load associated with the first sub-carrier. If the new bit load associated with a second sub-carrier is 6 bits, the bit load calculation unit 104 may allocate 4 bits to a first constituent bit load associated with the second sub-carrier and 2 bits to a second constituent bit load associated with the second sub-carrier. For other bit loads, the bit load calculation unit 104 may allocate an equal number of bits (e.g., new bit load/2) to a first and a second constituent bit loads associated with the sub-carrier. In another implementation, the predefined set of rules may vary depending on the bit loads supported by and agreed upon by the transmitting network device 150 and the receiving network device 160. The flow continues at block 1016.

At block 1016, based on the constituent bit loads, sub-carriers to which additional bits can be allocated are identified. For example, the bit load calculation unit 104 can identify, based on the constituent bit loads associated with each of the sub-carriers, one or more sub-carriers to which some/all of the bit load difference (determined at block 1012) can be allocated. In one implementation, on determining that a constituent bit load associated with a first sub-carrier is greater than or equal to the threshold bit load, an index of the first sub-carrier may be stored (e.g., in a vector or data structure) to indicate that the first sub-carrier can support an additional bit load. In some implementations, the sub-carriers that are associated a non-zero new bit load (determined at block 1008) may be further analyzed, based on their constituent bit loads, to determine whether the sub-carriers can support an additional bit load without exceeding an upper limit bit load threshold or without the SNR margin of the sub-carrier falling below an SNR margin threshold. For example, an original bit load associated with the first sub-carrier of 10 bits may be divided so that 6 bits are allocated to the first constituent bit load of the first sub-carrier and 4 bits are allocated to the second constituent bit load of the first sub-carrier. It may be determined that the upper limit bit load threshold is 6 bits and that 2 additional bits can be allocated to the second constituent bit load of the first sub-carrier. Accordingly, the bit load calculation unit 104 may store an index of the first sub-carrier (e.g., a sub-carrier number, a sub-carrier frequency, etc.), an identifier of the constituent bit load of the first sub-carrier (e.g., "2" can be stored to indicate that additional bits can be allocated to the second constituent bit load), and a number of additional bits that can be allocated to the first sub-carrier. It is noted that in some implementations, if there are no sub-carriers to which the difference bit load can be allocated, the difference bit load (determined at block 1012) can be allocated to a next OFDM symbol. The flow continues at block 1018 in FIG. 11.

At block 1018, a loop begins for each sub-carrier to which additional bits can be allocated to the constituent bit loads associated with the sub-carrier. As described above, with reference to block 1016, the bit load calculation unit 104 can keep track of sub-carriers to which additional bits can be allocated to the first and/or the second constituent bit loads associated with the sub-carriers. The flow continues at block 1020.

At block 1020, it is determined whether the bit load difference is greater than or equal to a predetermined number of bits that are to be allocated to the constituent bit load of the sub-carrier under consideration. For example, the bit load calculation unit 104 determines whether the bit load difference is greater than or equal to the predetermined number of bits that are to be allocated to the constituent bit load of the sub-carrier under consideration. In one implementation, as depicted in FIG. 11, the bit load allocation unit 104 may allocate a uniform number of bits (e.g., N bits) to the constituent bit load of each of the sub-carriers that can support additional bits. In another implementation, depending on a current bit load of the sub-carrier and the upper limit bit load threshold (or the threshold SNR margin), a variable number of bits of the difference bit load can be allocated to the constituent bit load of each of the sub-carriers that can support additional bits.

In some implementations, if the bit load difference is less than the predetermined number of bits, the bit load difference may be allocated along with bits of the next original symbol (as indicated below) to ensure that the constituent bit loads of the sub-carriers associated with the original symbol are supported even after some/all bits of the bit load difference is allocated to the constituent bit loads. For example, if a sub-carrier of a first symbol with a constituent bit load of 1-bit is eliminated (at block 1008), the bit load difference is 1 bit. Re-allocating the 1-bit bit load difference to a constituent bit load of another sub-carrier associated with the first symbol may result in the constituent bit load of the other sub-carrier having an odd number of bits, which may not be supported. Thus, in some implementations, the predetermined number of bits may be an even number of bits (e.g., 2 bits) to ensure that the constituent bit loads of the sub-carriers are supported (e.g., are allocated an even number of bits) even after some/all bits of the bit load difference is allocated to the constituent bit loads. It is noted that the predetermined number of bits can be any suitable number of bits depending on the bit loads that are supported at the transmitting network device 150 and the receiving network device 160. If it is determined that the bit load difference is greater than or equal to N bits, the flow continues at block 1022. Otherwise, the flow continues at block 1028.

At block 1022, the pre-determined number of bits of the bit load difference is allocated to the constituent bit load of the sub-carrier that can support an additional bit load. For example, the bit load calculation unit 104 can allocate the predetermined number of bits of the bit load difference to the constituent bit load of the sub-carrier that can support an additional bit load. However, in other implementations, depending on the constituent bit load allocated to the sub-carrier at block 1014, any suitable number of bits can be allocated. For example, if a first constituent bit load of the first sub-carrier is currently 4 bits and if the upper limit bit load threshold is 6 bits, the bit load calculation unit 104 can allocate 2 additional bits to the first constituent bit load of the first sub-carrier. As another example, if the first constituent bit load of the first sub-carrier is currently 2 bits and if the upper limit bit load threshold is 6 bits, the bit load calculation unit 104 can allocate 4 additional bits to the first constituent bit load of the first sub-carrier. In other implementations, the bit load calculation unit 104 can allocate additional bits to the second constituent bit load of the sub-carrier based on knowledge of a first constituent bit load of the sub-carrier. For example, an original bit load of 10 bits associated with the first sub-carrier may be divided so that 6 bits are allocated to the first constituent bit load of the first sub-carrier and 4 bits are allocated to the second constituent bit load of the first sub-carrier. Accordingly, the bit load calculation unit 104 can allocate 2 additional bits of the difference bit load to the second constituent bit load so that the first and the second constituent bit loads of the first sub-carrier are equal. As another example, an original bit load of 6 bits associated with a second sub-carrier may be divided so that 4 bits are allocated to the first constituent bit load of the second sub-carrier and 2 bits are allocated to the second constituent bit load of the second sub-carrier. Accordingly, the bit load calculation unit 104 can allocate 2 additional bits of the difference bit load to the second constituent bit load of the second sub-carrier so that the first and the second constituent bit loads of the second sub-carrier are equal. As another example, an original bit load of 8 bits associated with a third sub-carrier may be divided so that 4 bits are allocated to both the first and the second constituent bit loads of the third sub-carrier. Accordingly, the bit load calculation unit 104 may either allocate two bits of the bit load difference to both the first and the second constituent bit loads of the third sub-carrier, or may not allocate any additional bits to the first and the second constituent bit loads of the third sub-carrier so that the first and the second constituent bit loads of the third sub-carrier are equal. The flow continues at block 1024.

At block 1024, it is determined whether the bit load difference is greater than zero. For example, the bit load calculation unit 104 determines whether the bit load difference is greater than zero. The difference bit load being equal to zero (i.e., difference bit load is not greater than zero) indicates that all the bits previously allocated to the eliminated sub-carriers have been reallocated to constituent bit loads of other sub-carriers. If it is determined that the bit load difference is greater than zero, the flow continues at block 1026. Otherwise, the flow ends.

At block 1026, it is determined whether there exist additional sub-carriers to be analyzed. If it is determined that there exist additional sub-carriers to be analyzed, the flow continues at block 1018, where a next sub-carrier to which additional bits can be allocated to a constituent bit load of the next sub-carrier is identified. Otherwise, the flow continues at block 1028.

At block 1028, the bit load difference is allocated to the next original symbol. The flow 1000 also moves from block 1020 to block 1028 if it is determined that the bit load difference is less than a number of bits to be allocated to the constituent bit load of the sub-carrier. The bit load calculation unit 104 can indicate that the bit load difference (or the bits that could not be reallocated from eliminated sub-carriers to constituent bit loads of other sub-carriers) is to be allocated with bits of the next symbol. From block 1028, the flow ends.

It is noted that in some implementations, instead of (or in addition to) determining whether the original bit load is less than the threshold bit load (block 1006), other performance metrics can be analyzed and compared to predefined performance metric thresholds to determine whether to eliminate certain sub-carriers. For example, a signal to noise ratio (SNR) margin corresponding to the original bit load maybe compared against a threshold SNR margin. For example, the bit load calculation unit 104 can compare the SNR margin corresponding to the original bit load associated with the sub-carrier against the threshold SNR margin. In some implementations, the threshold SNR margin may be determined based on a minimum SNR margin associated with the threshold bit load. In another implementation, the threshold SNR margin may be determined based on a requisite minimum SNR margin improvement after bit allocation. For example, if the threshold SNR margin is 7 dB, only sub-carriers that yield an SNR margin of 7 dB or higher would be loaded. The sub-carriers that do not meet the threshold SNR margin may not be loaded or may be loaded using fractional bits. It is noted, however, that in other implementations other performance metrics can also be considered, such as signal to interference ratio (SIR), carrier to interference ratio (CIR), etc.

It is noted that the transmitting network device 150 and the receiving network device 160 can negotiate and agree upon the threshold SNR margin, the threshold bit load, how the bit loads of eliminated sub-carriers are to be reallocated, etc. Thus, if the bit load calculation unit 104 of the transmitting network device 150 eliminates the one of the sub-carriers (e.g., because the sub-carrier does not meet the threshold SNR margin), the bit load calculation unit 120 of the receiving network device 160 can independently perform the same operations described with reference to FIGS. 10-11 to eliminate the same sub-carrier that was eliminated at the transmitting network device 150. The bit load calculation unit 120 of the receiving network device 160 can reallocate bits of eliminated sub-carrier to generate the same tone map for the sub-carriers as the tone map generated at the transmitting network device 150, thus enabling the bit load reconstruction unit 122 to accurately reconstruct the original bit stream provided at the input of the transmitting network device 150. In other words, while the transmitting network device 150 calculates bit allocation for retransmitting packets, the receiving network device 160 calculates the same bit allocation to independently determine how the transmitting network device 150 will allocate bits in the transmitted packets (and therefore how to perform de-allocation operations). For example, the transmitter network device 150 and the receiving network device 160 may compute the bit load once after channel estimation and may then use the computed bit load for all the symbols in the transmitted packet. In some implementations, if an odd number of bits are to be reallocated, bit stuffing can be implemented to make the bit load an even number of bits and to meet tone map loading requirements (e.g., a threshold SNR margin, etc.).

Lastly, it is noted that the original bit load is divided into constituent bit loads based on bit loads supported by the bit allocation unit 110 at the transmitting network device 150 and the bit extraction unit 118 at the receiving network device 160. For example, a bit load of 10 can be divided so that 5 bits are each allocated to two constituent bit loads. If only even-numbered bit loads are supported and odd-numbered bit loads are not supported, the bit load of 10 can be divided into two lower even-number bit loads—6 bits and 4 bits. This concept can be generalized for N bit loads, such that bit loads $L_1 < L_2 < \ldots L_N$ and $L_j - L_i \geq 2$, where j=i+1 and i=1, 2, . . . N−1.

Operations for dynamic bit loading can be executed by dividing a bit load as depicted in Eq. 4.

$$L_i = L'_i + L''_i \qquad \text{Eq. 4}$$

where $L'_i \geq L''_i + 2$. The bit load $L'_i$ is the first constituent bit load that is allocated to the sub-carrier of the first constituent symbol. The bit load $L''_i$ is the second constituent bit load that is allocated to the sub-carrier of the second constituent symbol. Operations described with reference to FIGS. 10-11 for balancing the bit loads across two constituent bit loads associated with the sub-carrier comprises determining a bit load $(L_k)$ such that $L''_i + L_k < L_i$ to allocate additional bits to the second constituent symbol.

Figure 13:
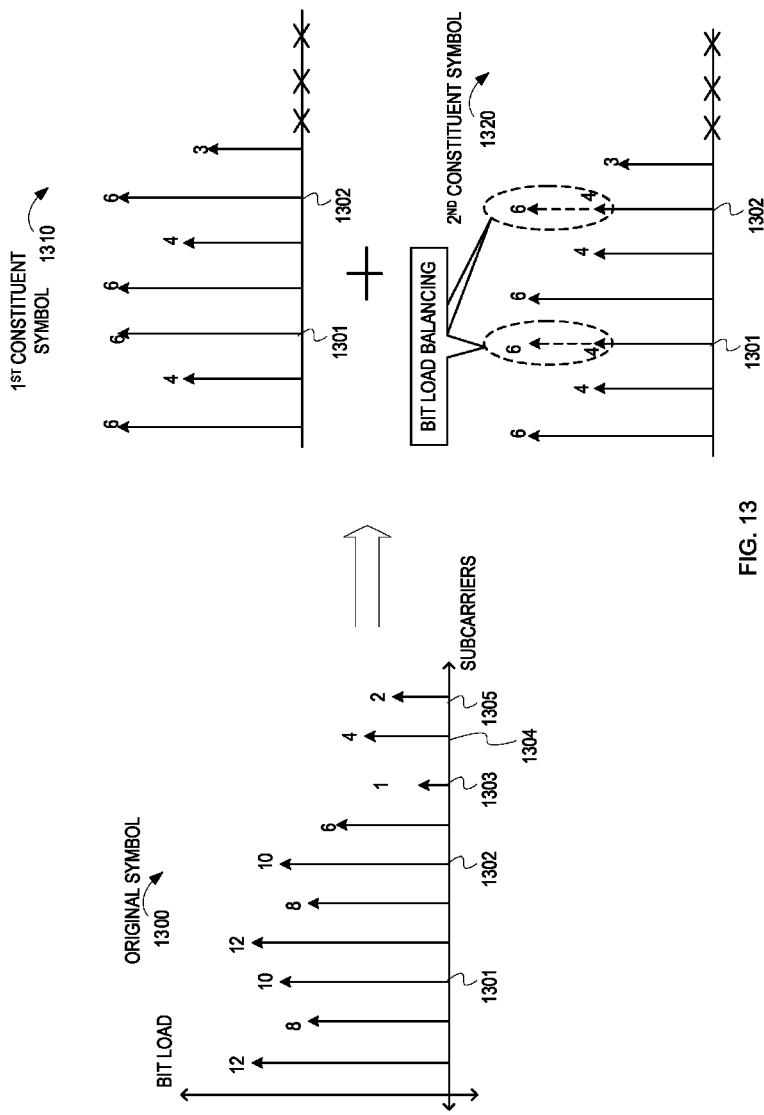
FIG. 13 is an example conceptual diagram illustrating dynamic bit load allocation in a spectral domain.

FIG. 13 depicts a tone map 1300 of an original OFDM symbol that indicates bit loading per sub-carrier. The tone map 1300 comprises multiple sub-carriers including sub-carriers 1301, 1302, 1303, 1304, and 1305. The tone map 1300 depicts the sub-carriers 1301 and 1302 having an original bit load of 10 bits. The sub-carrier 1303 has an original bit load of 1 bit, the sub-carrier 1304 has an original bit load of 4 bits, and the sub-carrier 1305 has an original bit load of 2 bits. In one example, the bit load threshold may be set to 6 bits. Therefore, in this example, the sub-carriers 1303, 1304, and 1305 that have original bit loads that are less than 6 bits are eliminated. During the bit allocation process, the tone map 1300 of the original OFDM symbol is split into two constituent tone maps 1310 and 1320 associated with a first constituent symbol and a second constituent symbol, respectively. The tone maps 1300, 1310, and 1320 illustrate how K-bit loading on the nth sub-carrier of the original OFDM symbol is spread to the nth sub-carrier of the two constituent OFDM symbols, while eliminating the sub-carriers 1303, 1304, and 1305 from the first and the second constituent symbols. The eliminated sub-carriers 1303, 1304, and 1305 are marked with "X" in the first constituent symbol 1310 and the second constituent symbol 1320. The original bit loads on the sub-carriers that were not eliminated (e.g., the sub-carriers 1301 and 1302) are mapped across the two constituent symbols to their corresponding sub-carriers, similarly as described above with reference to FIG. 4. For example, the 10 bits on the sub-carrier 1301 of the original OFDM symbol is allocated such that 6 bits are mapped to the sub-carrier 1301 of the first constituent symbol 1310 and the remaining 4 bits are mapped to the sub-carrier 1301 of the second constituent symbol 1320. The bit load of the eliminated sub-carriers 1303, 1304, and 1305 constitute the bit load difference which, in this example, is 7 bits. The bit load difference is allocated to one or more sub-carriers of the second constituent symbol 1320. In FIG. 13, 2 bits of the 7 bits of the bit load difference are each allocated to the sub-carriers 1301 and 1302 of the second constituent symbol 1320 (as shown by dashed arrows). In some implementations, the remaining 3 bits can be allocated to other sub-carriers of the second constituent symbol 1320, while in other implementations, the remaining 3 bits can be allocated along with the bits of a subsequent symbol.

Operations for bit allocation as described with reference to FIGS. 1-11 can be further extended by varying other transmit parameters such as transmit power and FEC rate, as will be further described below with reference to FIG. 12.

Figure 12:
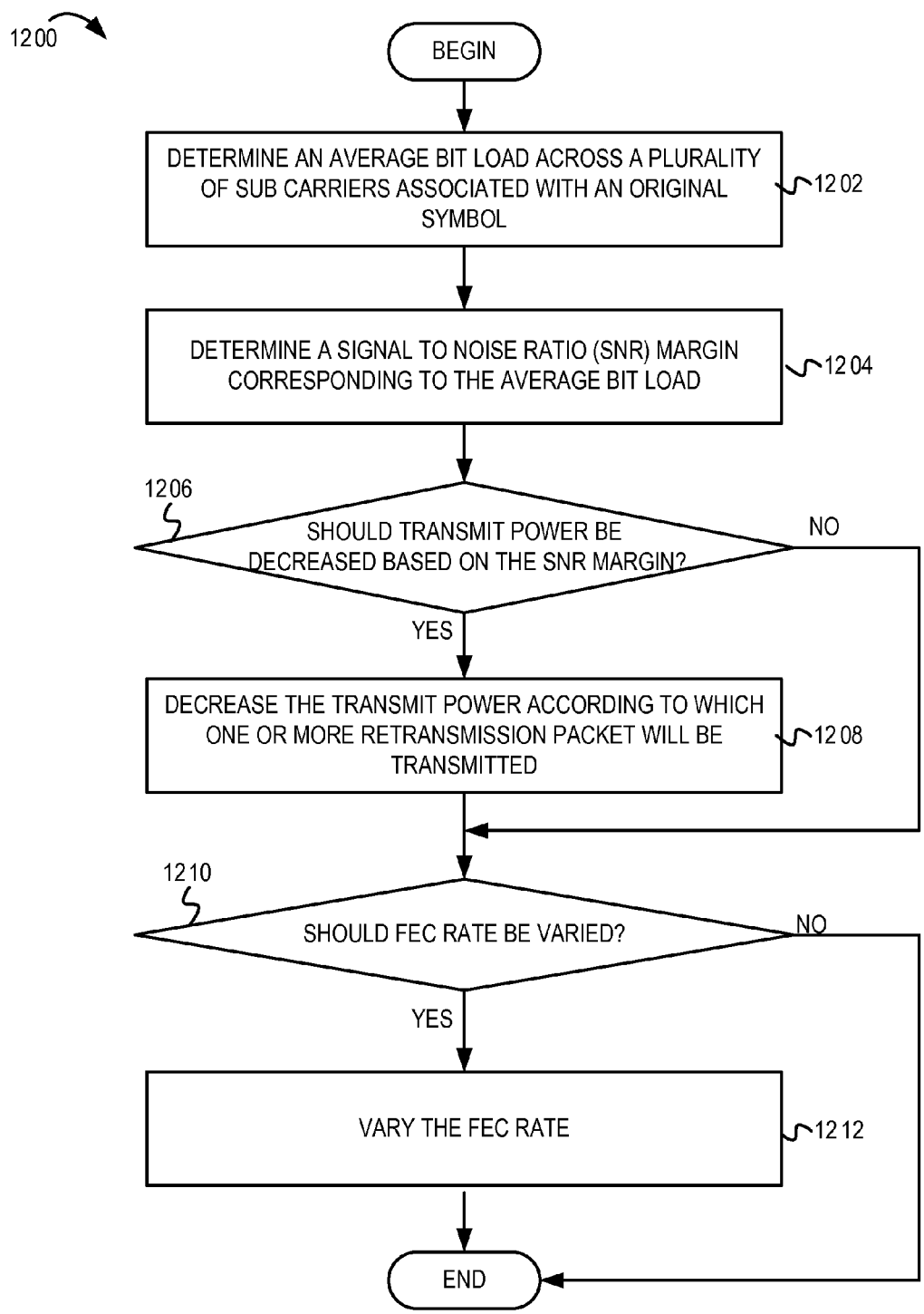
FIG. 12 is a flow diagram illustrating example operations for varying transmit parameters based on an SNR margin.

FIG. 12 is a flow diagram 1200 illustrating example operations for varying transmit parameters based on an SNR margin. The flow 1200 begins at block 1202.

At block 1202, an average bit load is determined across a plurality of sub-carriers associated with an original symbol. For example, a transmit parameters calculation unit (not shown) of the bit allocation unit of FIG. 1 can determine the average bit load across the plurality of sub-carriers. The average bit load may be determined as an average of the bit loads associated with each of the plurality of sub-carriers of an OFDM symbol. The flow continues at block 1204.

At block 1204, an average signal to noise ratio (SNR) margin corresponding to the average bit load is determined. For example, the bit allocation unit 110 can determine the average SNR margin corresponding to the average bit load. The average SNR margin corresponding to the average bit load can be determined based on channel estimation performed by the transmitting network device 150 and the receiving network device 160. For example, based on channel estimation, a noise floor may be determined. Accordingly, the average SNR margin required to overcome the determined noise floor may be calculated. The flow continues at block 1206.

At block 1206, it is determined, based on the average SNR margin, whether transmit power should be decreased. For example, the bit allocation unit 110 can determine whether the transmit power should be decreased based, at least in part, on the average SNR margin corresponding to the average bit load. If the average SNR margin associated with a symbol to be transmitted is greater than the threshold SNR margin, it may be possible to transmit at lower transmit power and still preserve integrity of a communication link between the transmitting network device 150 and the receiving network device 160. To determine whether the transmit power should be decreased, the bit allocation unit 110 can calculate a noise floor of the communication channel, determine a difference between the average SNR margin and the noise floor, and determine whether the calculated difference is less than a threshold SNR margin. For example, a communication channel with an average bit load of 12 bits may correspond to an SNR requirement of 33 dB. A bursty wideband interferer may produce a 5 dB noise floor rise. Dynamic bit allocation can result in an average bit load of 6 bits being allocated to the subcarriers, which may correspond to a SNR requirement of 15 dB. This results in an SNR margin of 18 dB (e.g., 33 dB-15 dB), which is above the 5 dB noise floor. The SNR margin of 18 dB indicates that the receiving network device 160 can tolerate up to 18 dB more noise or 18 dB deeper fade at the sub-carrier frequencies. Thus, it might be possible to transmit at 6 dB lower transmit power and still achieve the desired communication link performance assuming the noise floor is unchanged. It is noted that dynamic bit allocation technique can be used in conjunction with any suitable static or dynamic power adjustment schemes. If it is determined that the transmit power should be decreased, the flow continues at block 1208. Otherwise, the flow continues at block 1210.

At block 1208, the transmit power according to which one or more retransmission packets will be transmitted is decreased. For example, the bit allocation unit 110 can cause the transmission unit 112 to decrease the transmit power. In some implementations, the bit allocation unit 110 can cause the power amplifier 214 of FIG. 2 to reduce the gain applied to the OFDM signal prior to transmission. In some implementations, the transmit power may be decreased by a predetermined factor (e.g., by 3 dB). In another implementation, the transmit power may be decreased so that a new average SNR margin is equal to the threshold SNR margin. By transmitting at lower power, the transmitting network device 150 can reduce its interference to other neighboring network devices (e.g., the receiving network device 160), thus improving network performance. Transmitting at a low transmit power can also result in lower dynamic power consumption in the transmit path. The flow continues at block 1210.

At block 1210, it is determined whether a forward error correction (FEC) rate should be varied. For example, the bit allocation unit 104 determines whether the FEC rate should be varied. In some implementations, the bit allocation 104 can first determine whether the transmitting network device 150 and the receiving network device 160 support multiple FEC rates and whether the transmitting network device 150 and the receiving network device 160 have negotiated a mechanism for varying the FEC rate. The FEC rate influences the resilience of the communication link. Thus, the bit allocation unit 110 can determine whether the FEC rate should be varied based on the reliability of the communication link. If multiple FEC rates are supported, the bit load calculation unit 104 can determine whether a lower FEC rate can support allocating an original symbol into two constituent symbols. For example, the transmitting network device 150 may support three FEC rates—16/21 for an average communication channel, 8/9 for a clean communication channel, and 1/2 for a poor communication channel. If the FEC rate is reduced from 16/21 to 8/9, the average SNR margin may be reduced by 3 dB. However, processing the original bit stream at 8/9 FEC rate can result in 16.67% more bits per symbol corresponding to a reduction of one transmit symbol per six transmitted symbols. This, in turn, can result in a shorter transmit duration. As another example, if the FEC rate is increased from 16/21 to 1/2, the average SNR margin may increase by 5 dB. However, processing the original bit stream at 1/2 FEC rate can result in twice as many symbols being transmitted, which increases the transmit duration. The bit load calculation unit 104 can determine a new FEC rate based on the SNR margin, based on reliability of the communication link, the transmit power level, and based on FEC rates supported by the transmitting network device 150 and the receiving network device 160. If it is determined that the FEC rate should be varied, the flow continues at block 1212. Otherwise, the flow ends.

At block 1212, the FEC rate is varied. For example, the bit allocation unit 104 can cause an FEC encoding unit (not shown but may be implemented as part of the bit processing unit 201 of FIG. 2) of the transmitting network device 150 to vary the FEC rate. From block 1212, the flow ends.

It should be understood that FIGS. 1-13 are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-13 describe operations for dynamic bit allocation being implemented for powerline communications, embodiments are not so limited. The operations described herein may be implemented by any OFDM-based system including but not limited by wireless OFDM modems, WLAN radio interfaces, digital radio systems, etc. that encounters strong wideband burst interference or impairments, whereby the signal energy is degraded over a wide frequency band and over multiple symbols. Moreover, dynamic bit allocation can also be applied to multi-band multi-carrier systems. For example, a waveform may comprise multiple frequency bands (e.g., a 2.4 GHz and a 5 GHz band). Each frequency band may be transmitted at different power levels resulting in a different maximum bit load capability for each frequency band because of the different signal energies in each of the frequency bands. Operations for dynamic bit allocation as described herein can be executed independently for each frequency band to achieve desired SNR margin gains on each sub-carrier of each frequency band.

Although FIG. 1 and FIG. 2 describe FEC encoding and interleaving being performed prior to bit allocation across multiple constituent symbols, embodiments are not so limited. In some implementations, bit allocation across multiple constituent symbols may be performed prior to FEC encoding and interleaving. In other words, the bit allocation unit 110 can split the original bit stream into a two constituent bit streams and provide the two constituent bit streams for subsequent processing by the bit processing unit 201. The bit processing unit 201 can FEC encode, interleave, etc. the two constituent bit streams. It is noted that the transmitting network device 150 and the receiving network device 160 can agree upon the sequence of operations (e.g., whether FEC and interleaving should be performed prior to or following bit allocation) to enable proper reconstruction at the receiving network device 160.

Operations described with reference to FIGS. 1-13 can also be employed in a neighbor network mitigation scheme whereby communication rates of each network can be halved thus increasing support for a larger number of neighbor networks (e.g., powerline networks) in the communication medium (e.g., the powerline communication medium) because of an improved SNR margin per sub-carrier. For example, a multi-dwelling unit (MDU) environment can comprise multiple independent neighboring powerline networks or neighbor networks. Lastly, it is also noted that in some implementations, a requisite SNR margin may be set and dynamic bit allocation may be performed to meet the requisite SNR margin. The requisite SNR margin can be determined based on an average required SNR as described above with reference to FIGS. 10-11.

It is also noted that in other embodiments other techniques can be implemented for bit load balancing. In some embodiments, for bit load balancing, the bit load calculation unit 104 can consider the bits previously mapped to each sub-carrier as a stream of bits and can reallocate the bits to each sub-carrier of the constituent symbols and irrespective of the sub-carrier to which the bits were originally allocated. In other words, after determining which sub-carriers will be eliminated, the bits previously mapped to each sub-carrier can be considered as a stream of bits, and these bits can be reallocated to the sub-carriers that will not be eliminated for each of the constituent symbols.

Lastly, it is noted that although FIG. 12 depicts operations for varying the transmit power prior to varying the FEC, embodiments are not so limited. In other implementations, the FEC rate may be varied independently of varying the transmit power. Furthermore, in other implementations, the FEC rate may be varied prior to varying the transmit power and a factor by which the transmit power is varied may depend on a new FEC rate.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 14:
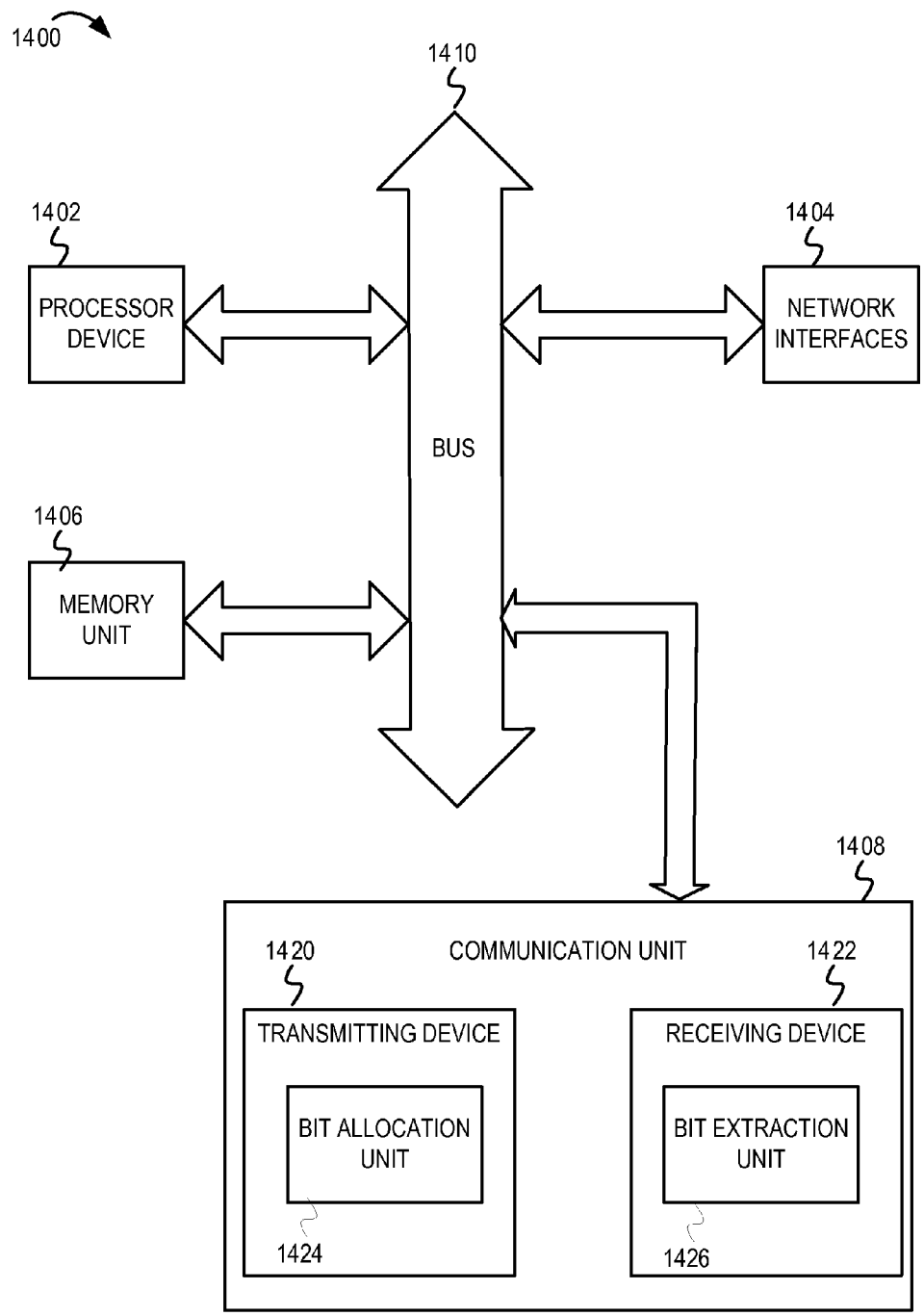
FIG. 14 is a block diagram of one embodiment of an electronic device including a mechanism for dynamic bit allocation.

FIG. 14 is a block diagram of one embodiment of an electronic device 1400 including a mechanism for dynamic bit allocation. In some implementations, the electronic device 1400 may be a personal computer (PC), a laptop, a netbook, a mobile phone, a personal digital assistant (PDA), a smart appliance, or other electronic systems configured to communicate across a wired network (e.g., a powerline network or an Ethernet network) or a wireless communication network (e.g., WLAN). The electronic device 1400 includes a processor device 1402 (possibly including multiple processors, multiple cores, multiple nodes, and/or implementing multi-threading, etc.). The electronic device 1400 includes a memory unit 1406. The memory unit 1406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1400 also includes a bus 1410 (e.g., PCI, ISA, PCI-Express, HyperTransport®, InfiniBand®, NuBus, AHB, AXI, etc.), and network interfaces 1404 that include at least one wired network interface (e.g., a powerline communication interface) or a wireless network interface (e.g., a WLAN interface, a Bluetooth® interface, a WiMAX interface, a ZigBee® interface, a Wireless USB interface, etc.).

The electronic device 1400 also includes a communication unit 1408. The communication unit 1408 may comprise a wired communication device (e.g., a powerline device or an Ethernet device), or a wireless communication devices (e.g., a WLAN device). The communication unit 1408 comprises a transmitting device 1420 and a receiving device 1422. The transmitting device 1420 comprises a bit allocation unit 1424. The receiving device 1422 comprises a bit extraction unit 1426. The transmitting device 1420 performs operations for dynamically allocating bits of original symbols (with or without implementing the balanced bit allocation process) of a failed transmit packet across two or more constituent symbols and across one or more retransmission packets as described in accordance with FIGS. 1-13. The receiving device 1422 also performs reverse operations as described with reference to FIGS. 1-13 for reordering bits of the one or more retransmission packets to recreate an original bit stream. In some embodiments, the communication unit 1408 may include two or more wired or wireless communication devices in the same integrated circuit (e.g., a system-on-a-chip) or in the same circuit board within the electronic device 1400. For example, the communication unit 1408 can include a powerline device, a WLAN device, and/or a Bluetooth device.

While the embodiments are described with reference to various implementations and exploitations, it will be understood that these embodiments are illustrative and that the scope of the inventive subject matter is not limited to them. In general, techniques for balanced bit loading for networks subject to burst interference as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method comprising:
    determining, at a first network device of a communication network, that a transmission of an original packet to a second network device of the communication network failed, wherein the original packet comprises one or more original symbols;
    identifying, at the first network device, for each original symbol of the original packet, a subset of a plurality of sub-carriers of the original symbol that are associated with a bit load that is less than a predefined bit load threshold;
    eliminating, at the first network device, for each original symbol of the original packet, the subset of the plurality of sub-carriers that are associated with the bit load that is less than the predefined bit load threshold;
    allocating, at the first network device, for each original symbol of the original packet, a bit load of each of a remainder of the plurality of sub-carriers of the original symbol across two or more constituent symbols associated with the original symbol;
    determining, at the first network device, for each original symbol of the original packet, how to allocate at least a portion of the bit loads associated with the subset of the plurality of sub-carriers of the original symbol that were eliminated across the two or more constituent symbols associated with the original symbol; and allocating at least the portion of the bit loads associated with the subset of the plurality of sub-carriers of the original symbol that were eliminated to the two or more constituent symbols associated with the original symbol.

2. The method of claim 1, wherein said allocating at least the portion of the bit loads associated with the subset of the plurality of sub-carriers of the original symbol that were eliminated to the two or more constituent symbols associated with the original symbol comprises:
allocating at least the portion of the bit loads associated with the subset of the plurality of sub-carriers of the original symbol that were eliminated to one or more of the remainder of the plurality of the sub-carriers that are associated with the two or more constituent symbols associated with the original symbol.

3. The method of claim 1, wherein said allocating at least the portion of the bit loads associated with the subset of the plurality of sub-carriers of the original symbol that were eliminated to the two or more constituent symbols associated with the original symbol further comprises:
identifying one or more of the remainder of the plurality of sub-carriers to which the bit loads associated with the subset of the plurality of sub-carriers are to be allocated based, at least in part, on constituent bit loads of each of the remainder of the plurality of sub-carriers of the two or more constituent symbols associated with the original symbol.

4. The method of claim 3, wherein said identifying one or more of the remainder of the plurality of sub-carriers to which the bit loads associated with the subset of the plurality of sub-carriers are to be allocated comprises:
for each of the remainder of the plurality of sub-carriers associated with the two or more constituent symbols of the original symbol,
determining whether at least one of the constituent bit loads of the sub-carrier is less than a predefined maximum bit load threshold;
determining that at least the portion of the bit loads associated with the subset of the plurality of sub-carriers is to be allocated to the sub-carrier if it is determined that at least one of the constituent bit loads of the sub-carrier is less than the predefined maximum bit load threshold; and
determining that at least the portion of the bit loads associated with the subset of the plurality of sub-carriers is not to be allocated to the sub-carrier if it is determined that each of the constituent bit loads of the sub-carrier is greater than or equal to the predefined maximum bit load threshold.

5. The method of claim 3, wherein said allocating at least the portion of the bit loads associated with the subset of the plurality of sub-carriers of the original symbol that were eliminated to the two or more constituent symbols associated with the original symbol further comprises:
determining a bit load difference as an aggregation of the bit loads associated with the subset of the plurality of sub-carriers of the original symbol that were eliminated;
for each of the one or more of the remainder of the plurality of sub-carriers to which the bit loads associated with the subset of the plurality of sub-carriers are to be allocated,
identifying a number of bits of the bit load difference to be allocated to the constituent bit loads associated with the sub-carrier; and
allocating the identified number of bits of the bit load difference to the constituent bit loads associated with the sub-carrier to yield new constituent bit loads associated with the sub-carrier, such that a sum of the new constituent bit loads associated with the sub-carrier is equal to a sum of the constituent bit loads associated with the sub-carrier and the identified number of bits of the bit load difference allocated to the constituent bit loads.

6. The method of claim 5, wherein said allocating, for each of the one or more of the remainder of the plurality of sub-carriers to which the bit loads associated with the subset of the plurality of sub-carriers are to be allocated, the identified number of bits of the bit load difference to the constituent bit loads associated with the sub-carrier comprises:
for each of the one or more of the remainder of the plurality of sub-carriers to which the bit loads associated with the subset of the plurality of sub-carriers are to be allocated,
determining whether the identified number of bits of the bit load difference is greater than or equal to a predetermined number of bits;
allocating the identified number of bits of the bit load difference to the constituent bit loads associated with the sub-carrier if it is determined that the identified number of bits of the bit load difference is greater than or equal to the predetermined number of bits;
determining to allocate the identified number of bits of the bit load difference to a subsequent original symbol of the original packet if it is determined that the identified number of bits of the bit load difference is less than the predetermined number of bits;
calculating a new bit load difference as a difference between the bit load difference and the identified number of bits allocated to the constituent bit loads associated with each of the one or more of the remainder of the plurality of sub-carriers to which the bit loads associated with the subset of the plurality of sub-carriers are to be allocated;
determining that the new bit load difference is greater than zero; and
determining to allocate the new bit load difference to the subsequent original symbol of the original packet based on said determining that the new bit load difference is greater than zero.

7. The method of claim 5, further comprising:
determining that that bit load difference associated with the original symbol cannot be allocated to any of the constituent bit loads associated with the remainder of the plurality of sub-carriers of the original symbol; and
determining to allocate the bit load difference associated with the original symbol to a subsequent original symbol of the original packet.

8. The method of claim 1, wherein said allocating, at the first network device, for each original symbol of the original packet, the bit load of each of the remainder of the plurality of sub-carriers of the original symbol across the two or more constituent symbols associated with the original symbol comprises:
determining, for each original symbol of the original packet, how to allocate the bit load of each of the remainder of the plurality of sub-carriers of the original symbol across constituent bit loads of each corresponding sub-carrier of two constituent symbols associated with the original symbol wherein the bit load of each of the remainder of the plurality of sub-carriers of the original symbol is greater than or equal to the predefined bit load threshold; and
allocating, for each original symbol of the original packet, a portion of the bit load of each of the remainder of the plurality of sub-carriers of the original symbol to a first constituent bit load of each corresponding sub-carrier of a first constituent symbol, and allocating a remaining portion of the bit load of each of the remainder of the plurality of sub-carriers of the original symbol to a second constituent bit load of each corresponding sub-carrier of a second constituent symbol.

9. The method of claim 8, wherein said determining for each original symbol of the original packet, how to allocate the bit load of each of the remainder of the plurality of sub-carriers of the original symbol across constituent bit loads of each corresponding sub-carrier of two constituent symbols associated with the original symbol further comprises:
for each of the remainder of the plurality of sub-carriers of the original symbol,
identifying the bit load associated with the sub-carrier of the original symbol, wherein the bit load indicates a number of bits that are mapped to the sub-carrier of the original symbol; and
determining to allocate the bit load of the sub-carrier of the original symbol equally between a first constituent bit load of a corresponding sub-carrier of a first constituent symbol and a second constituent bit load of a corresponding sub-carrier of a second constituent symbol.

10. The method of claim 9, wherein, for each of the remainder of the plurality of sub-carriers of the original symbol, said determining to allocate the bit load of the sub-carrier of the original symbol equally between the first constituent bit load of the corresponding sub-carrier of the first constituent symbol and the second constituent bit load of the corresponding sub-carrier of the second constituent symbol further comprises:
for each of the remainder of the plurality of sub-carriers of the original symbol,
determining that the first and the second constituent bit loads of the corresponding subcarrier, which are determined by allocating the bit load associated with the sub-carrier of the original symbol equally between the first and the second constituent bit loads, are not supported at the first network device;
in response to determining that the first and the second constituent bit loads of the corresponding sub-carrier are not supported at the first network device, incrementing the first constituent bit load of the first constituent symbol by a predefined value and decrementing the second constituent bit load of the second constituent symbol by the predefined value;
determining whether the first constituent bit load of the corresponding subcarrier is equal to the bit load associated with the sub-carrier of the original symbol or whether the second constituent bit load of the corresponding subcarrier is equal to zero; and
in response to determining that the first constituent bit load of the corresponding subcarrier is equal to the bit load associated with the sub-carrier of the original symbol or that the second constituent bit load of the corresponding subcarrier is equal to zero, determining to allocate the bit load associated with the sub-carrier of the original symbol to both the first constituent bit load and the second constituent bit load of the corresponding sub-carrier.

11. The method of claim 1, further comprising:
allocating, at the first network device, the two or more constituent symbols associated with each original symbol of the original packet to one or more retransmission packets; and
transmitting the one or more retransmission packets from the first network device to the second network device.

12. The method of claim 1, wherein said eliminating, at the first network device, for each original symbol of the original packet, the subset of the plurality of sub-carriers that are associated with the bit load that is less than the predefined bit load threshold comprises:
eliminating the subset of the plurality of sub-carriers that are associated with a signal to noise ratio margin that is less than a predefined signal to noise ratio margin threshold.

13. The method of claim 1, further comprising:
determining an average bit load based on the bit load of each sub-carrier of the plurality of sub-carriers of the original symbol;
determining a signal to noise ratio margin that corresponds to the average bit load;
determining that a transmit power for transmitting one or more retransmission packets that constitute the two or more constituent symbols associated with each original symbol from the first network device to the second network device should be decreased based, at least in part, on the signal to noise ratio margin that corresponds to the average bit load and a noise floor of a communication channel between the first network device and the second network device; and
causing the transmit power to be decreased by a predetermined power in response to said determining that the transmit power for transmitting the one or more retransmission packets to the second network device should be decreased.

14. The method of claim 13, further comprising:
varying a forward error correction (FEC) rate in response to determining that the FEC rate should be varied based on one or more of the average bit load, the signal to noise ratio margin associated with the average bit load, and the transmit power.

15. The method of claim 1, further comprising:
determining an average bit load based on the bit load of each sub-carrier of the plurality of sub-carriers of the original symbol;
determining a signal to noise ratio margin that corresponds to the average bit load;
determining that a forward error correction (FEC) rate for transmitting one or more retransmission packets that constitute the two or more constituent symbols associated with each original symbol from the first network device to the second network device should be varied based, at least in part, on one or more of the average bit load, the signal to noise ratio margin that corresponds to the average bit load, and a transmit power for transmitting the one or more retransmission packets from the first network device to the second network device; and
causing the FEC rate to be varied by a predetermined factor in response to said determining that the FEC rate for transmitting the one or more retransmission packets should be varied.

16. A communication network device comprising:
a processor;
a network interface coupled to the processor; and
a bit load calculation unit coupled to the processor and to the network interface, the bit load calculation unit operable to:
determine that a transmission of an original packet from the communication network device to a second communication network device of a communication network failed, wherein the original packet comprises one or more original symbols;

identify for each original symbol of the original packet, a subset of a plurality of sub-carriers of the original symbol that are associated with a bit load that is less than a predefined bit load threshold;

eliminate for each original symbol of the original packet, the subset of the plurality of sub-carriers that are associated with the bit load that is less than the predefined bit load threshold;

allocate for each original symbol of the original packet, a bit load of each of a remainder of the plurality of sub-carriers of the original symbol across two or more constituent symbols associated with the original symbol;

determine for each original symbol of the original packet, how to allocate at least a portion of the bit loads associated with the subset of the plurality of sub-carriers of the original symbol that were eliminated across the two or more constituent symbols associated with the original symbol; and allocate at least the portion of the bit loads associated with the subset of the plurality of sub-carriers of the original symbol that were eliminated to the two or more constituent symbols associated with the original symbol.

17. The communication network device method of claim 16, wherein the bit load calculation unit operable to allocate at least the portion of the bit loads associated with the subset of the plurality of sub-carriers of the original symbol that were eliminated to the two or more constituent symbols associated with the original symbol comprises:

a symbol generation unit operable to:
allocate at least the portion of the bit loads associated with the subset of the plurality of sub-carriers of the original symbol that were eliminated to one or more of the remainder of the plurality of the sub-carriers that are associated with the two or more constituent symbols associated with the original symbol.

18. The communication network device of claim 16, wherein the bit load calculation unit operable to allocate at least the portion of the bit loads associated with the subset of the plurality of sub-carriers of the original symbol that were eliminated to the two or more constituent symbols associated with the original symbol further comprises the bit load calculation unit operable to:

identify one or more of the remainder of the plurality of sub-carriers to which the bit loads associated with the subset of the plurality of sub-carriers are to be allocated based, at least in part, on constituent bit loads of each of the remainder of the plurality of sub-carriers of the two or more constituent symbols associated with the original symbol.

19. The communication network device of claim 18, wherein the bit load calculation unit operable to identify one or more of the remainder of the plurality of sub-carriers to which the bit loads associated with the subset of the plurality of sub-carriers are to be allocated comprises the bit load calculation unit operable to:

for each of the remainder of the plurality of sub-carriers associated with the two or more constituent symbols of the original symbol,
determine whether at least one of the constituent bit loads of the sub-carrier is less than a predefined maximum bit load threshold;
determine that at least the portion of the bit loads associated with the subset of the plurality of sub-carriers is to be allocated to the sub-carrier in response to the bit load calculation unit determining that at least one of the constituent bit loads of the sub-carrier is less than the predefined maximum bit load threshold; and
determine that at least the portion of the bit loads associated with the subset of the plurality of sub-carriers is not to be allocated to the sub-carrier in response to the bit load calculation unit determining that each of the constituent bit loads of the sub-carrier is greater than or equal to the predefined maximum bit load threshold.

20. The communication network device of claim 18, wherein the bit load calculation unit operable to allocate at least the portion of the bit loads associated with the subset of the plurality of sub-carriers of the original symbol that were eliminated to the two or more constituent symbols associated with the original symbol further comprises the bit load calculation unit operable to:

determine a bit load difference as an aggregation of the bit loads associated with the subset of the plurality of sub-carriers of the original symbol that were eliminated;
for each of the one or more of the remainder of the plurality of sub-carriers to which the bit loads associated with the subset of the plurality of sub-carriers are to be allocated,
identify a number of bits of the bit load difference to be allocated to the constituent bit loads associated with the sub-carrier; and
allocate the identified number of bits of the bit load difference to the constituent bit loads associated with the sub-carrier to yield new constituent bit loads associated with the sub-carrier, such that a sum of the new constituent bit loads associated with the sub-carrier is equal to a sum of the constituent bit loads associated with the sub-carrier and the identified number of bits of the bit load difference allocated to the constituent bit loads.

21. The communication network device of claim 20, wherein the bit load calculation unit operable to allocate, for each of the one or more of the remainder of the plurality of sub-carriers to which the bit loads associated with the subset of the plurality of sub-carriers are to be allocated, the identified number of bits of the bit load difference to the constituent bit loads associated with the sub-carrier comprises the bit load calculation unit operable to:

for each of the one or more of the remainder of the plurality of sub-carriers to which the bit loads associated with the subset of the plurality of sub-carriers are to be allocated,
determine whether the identified number of bits of the bit load difference is greater than or equal to a predetermined number of bits;
allocate the identified number of bits of the bit load difference to the constituent bit loads associated with the sub-carrier in response to the bit load calculation unit determining that the identified number of bits of the bit load difference is greater than or equal to the predetermined number of bits;
determine to allocate the identified number of bits of the bit load difference to a subsequent original symbol of the original packet in response to the bit load calculation unit determining that the identified number of bits of the bit load difference is less than the predetermined number of bits;
calculate a new bit load difference as a difference between the bit load difference and the identified number of bits allocated to the constituent bit loads associated with each of the one or more of the remainder of the plurality of sub-carriers to which the bit loads associated with the subset of the plurality of sub-carriers are to be allocated;

determine that the new bit load difference is greater than zero;

determine to allocate the new bit load difference to a subsequent original symbol of the original packet in response to the bit load calculation unit determining that the new bit load difference is greater than zero.

22. The communication network device of claim 20, wherein the bit load calculation unit is further operable to:

determine that that bit load difference associated with the original symbol cannot be allocated to any of the constituent bit loads associated with the remainder of the plurality of sub-carriers of the original symbol; and determine to allocate the bit load difference associated with the original symbol to a subsequent original symbol of the original packet.

23. The communication network device of claim 16, wherein the bit load calculation unit is further operable to: determine an average bit load based on the bit load of each sub-carrier of the plurality of sub-carriers of the original symbol;

determine a signal to noise ratio margin that corresponds to the average bit load;

determine that a transmit power for transmitting the one or more retransmission packets that constitute the two or more constituent symbols associated with each original symbol to the second communication network device should be decreased based, at least in part, on the signal to noise ratio margin that corresponds to the average bit load and a noise floor of a communication channel between the communication network device and the second communication network device; and cause the transmit power to be decreased by a predetermined power in response to the bit load calculation unit determining that the transmit power for transmitting the one or more retransmission packets to the second communication network device should be decreased.

24. The communication network device of claim 16, further comprising:

a packet generation unit operable to:

allocate the two or more constituent symbols associated with each original symbol of the original packet to one or more retransmission packets; and a transmission unit operable to:

transmit the one or more retransmission packets from the communication network device to the second communication network device.

25. One or more non-transitory machine-readable storage media having instructions stored therein, which when executed by one or more processor units causes the one or more processor units to perform operations that comprise: determining that a transmission of an original packet from a first network device to a second network device of a communication network failed, wherein the original packet comprises one or more original symbols; identifying, for each original symbol of the original packet, a subset of a plurality of sub-carriers of the original symbol that are associated with a bit load that is less than a predefined bit load threshold; eliminating, for each original symbol of the original packet, the subset of the plurality of sub-carriers that are associated with the bit load that is less than the predefined bit load threshold; allocating, for each original symbol of the original packet, a bit load of each of a remainder of the plurality of sub-carriers of the original symbol across two or more constituent symbols associated with the original symbol; determining, for each original symbol of the original packet, how to allocate at least a portion of the bit loads associated with the subset of the plurality of sub-carriers of the original symbol that were eliminated across the two or more constituent symbols associated with the original symbol; and allocating at least the portion of the bit loads associated with the subset of the plurality of sub-carriers of the original symbol that were eliminated to the two or more constituent symbols associated with the original symbol.

26. The non-transitory machine-readable storage media of claim 25, wherein said operation of allocating at least the portion of the bit loads associated with the subset of the plurality of sub-carriers of the original symbol that were eliminated to the two or more constituent symbols associated with the original symbol comprises: allocating at least the portion of the bit loads associated with the subset of the plurality of sub-carriers of the original symbol that were eliminated to one or more of the remainder of the plurality of the sub-carriers that are associated with the two or more constituent symbols associated with the original symbol.

27. The non-transitory machine-readable storage media of claim 25, wherein said operation of allocating at least the portion of the bit loads associated with the subset of the plurality of sub-carriers of the original symbol that were eliminated to the two or more constituent symbols associated with the original symbol further comprises: identifying one or more of the remainder of the plurality of sub-carriers to which the bit loads associated with the subset of the plurality of sub-carriers are to be allocated based, at least in part, on constituent bit loads of each of the remainder of the plurality of sub-carriers of the two or more constituent symbols associated with the original symbol.

28. The non-transitory machine-readable storage media of claim 27, wherein said operation of identifying one or more of the remainder of the plurality of sub-carriers to which the bit loads associated with the subset of the plurality of sub-carriers are to be allocated comprises: for each of the remainder of the plurality of sub-carriers associated with the two or more constituent symbols of the original symbol, determining whether at least one of the constituent bit loads of the sub-carrier is less than a predefined maximum bit load threshold; determining that at least the portion of the bit loads associated with the subset of the plurality of sub-carriers is to be allocated to the sub-carrier if it is determined that at least one of the constituent bit loads of the sub-carrier is less than the predefined maximum bit load threshold; and determining that at least the portion of the bit loads associated with the subset of the plurality of sub-carriers is not to be allocated to the sub-carrier if it is determined that each of the constituent bit loads of the sub-carrier is greater than or equal to the predefined maximum bit load threshold.

29. The non-transitory machine-readable storage media of claim 27, wherein said operation of allocating at least the portion of the bit loads associated with the subset of the plurality of sub-carriers of the original symbol that were eliminated to the two or more constituent symbols associated with the original symbol further comprises: determining a bit load difference as an aggregation of the bit loads associated with the subset of the plurality of sub-carriers of the original symbol that were eliminated; for each of the one or more of the remainder of the plurality of sub-carriers to which the bit loads associated with the subset of the plurality of sub-carriers are to be allocated, identifying a number of bits of the bit load difference to be allocated to the constituent bit loads associated with the sub-carrier; and determining whether the identified number of bits of the bit load difference is greater than or equal to a predetermined number of bits; allocating the identified number of bits of the bit load difference to the constituent bit loads associated with the sub-carrier if it is determined that the identified number of bits of the bit load difference is greater than or equal to the predetermined number of bits; determining to allocate the identified number of bits of the bit load difference to a subsequent original symbol of the original packet if it is determined that the identified number of bits of the bit load difference is less than the predetermined number of bits; calculating a new bit load difference as a difference between the bit load difference and the identified number of bits allocated to the constituent bit loads associated with each of the one or more of the remainder of the plurality of sub-carriers to which the bit loads associated with the subset of the plurality of sub-carriers are to be allocated; determining that the new bit load difference is greater than zero; determining to allocate the new bit load difference to the subsequent original symbol based on said operation of determining that the new bit load difference is greater than zero.

30. The non-transitory machine-readable storage media of claim 25, wherein the operations further comprise: allocating the two or more constituent symbols associated with each original symbol of the original packet to one or more retransmission packets; and transmitting the one or more retransmission packets from the first network device to the second network device.

\* \* \* \* \*